US012698623B2

(12) United States Patent
Garrels et al.

(10) Patent No.: US 12,698,623 B2
(45) Date of Patent: Aug. 4, 2026

(54) MULTI-HEAD FLUIDIC OSCILLATORS

(71) Applicant: Kohler Co., Kohler, WI (US)

(72) Inventors: Clayton C. Garrels, Sheboygan, WI (US); Kayla Wolfe, Kohler, WI (US)

(73) Assignee: Kohler Co., Kohler, WI (US)

( * ) Notice: Subject to any disclaimer, the term of this patent is extended or adjusted under 35 U.S.C. 154(b) by 29 days.

(21) Appl. No.: 18/763,740

(22) Filed: Jul. 3, 2024

(65) Prior Publication Data

US 2025/0027312 A1 Jan. 23, 2025

Related U.S. Application Data

(60) Provisional application No. 63/527,450, filed on Jul. 18, 2023.

(51) Int. Cl.
*E03D 9/08* (2006.01)
*B05B 1/08* (2006.01)
(Continued)

(52) U.S. Cl.
CPC ................. *E03D 9/08* (2013.01); *B05B 1/08* (2013.01); *E03C 1/08* (2013.01); *E03D 9/06* (2013.01);
(Continued)

(58) Field of Classification Search
CPC .... E03D 9/08; E03D 9/06; E03D 9/16; E03D 2201/30; E03D 2201/40; E03D 11/13;
(Continued)

(56) References Cited

U.S. PATENT DOCUMENTS

| | | | |
|---|---|---|---|
| 6,860,157 B1 | 3/2005 | Yang et al. |
| 7,111,800 B2 | 9/2006 | Berning et al. |

(Continued)

FOREIGN PATENT DOCUMENTS

| | | |
|---|---|---|
| CN | 205935127 U | 2/2017 |
| EP | 3150284 A1 | 4/2017 |

(Continued)

OTHER PUBLICATIONS

Extended European Search Report from European Patent Application No. 24188671.2, dated May 2, 2025, 13 pages.

(Continued)

*Primary Examiner* — Minh Q Le
(74) *Attorney, Agent, or Firm* — Lempia Summerfield Katz LLC

(57) ABSTRACT

Provided is a fluidic device including a housing configured to receive a flow of water and including an outlet configured to dispense a flow of water, a flexible component comprised of a first material configured to be disposed within the housing, the flexible component including a base, a first leg extending from the base, a second leg extending from the base, and an opening extending through the first leg, and an insert comprised of a second material, different than the first material, the insert configured to be disposed within the housing between the first leg and the second leg, the housing, flexible component, and insert being configured to form at least one modular fluid oscillator when the flexible component and insert are disposed in the housing.

17 Claims, 16 Drawing Sheets

(51) Int. Cl.

| | |
|---|---|
| *E03C 1/08* | (2006.01) |
| *E03D 9/06* | (2006.01) |
| *E03D 9/16* | (2006.01) |
| *E03D 11/06* | (2006.01) |
| *E03D 11/13* | (2006.01) |
| *E03D 11/16* | (2006.01) |
| *F15C 1/22* | (2006.01) |

(52) U.S. Cl.
CPC ................ *E03D 9/16* (2013.01); *E03D 11/06* (2013.01); *E03D 11/13* (2013.01); *E03D 11/16* (2013.01); *E03D 2201/30* (2013.01); *E03D 2201/40* (2013.01); *F15C 1/22* (2013.01)

(58) Field of Classification Search
CPC . E03D 11/06; E03D 11/16; B05B 1/08; E03C 1/08; F15C 1/22
USPC .......................................................... 137/826
See application file for complete search history.

(56) References Cited

U.S. PATENT DOCUMENTS 7,267,290 B2 9/2007 Gopalan et al.
7,472,848 B2 1/2009 Gopalan et al.
7,478,764 B2 1/2009 Gopalan
7,651,036 B2 1/2010 Gopalan
7,677,480 B2 3/2010 Russell et al.
7,775,456 B2 8/2010 Gopalan et al.
8,172,162 B2 5/2012 Gopalan
8,205,812 B2 6/2012 Hester et al.
8,261,377 B2 9/2012 Oh
8,662,421 B2 3/2014 Russell et al.
8,702,020 B2 4/2014 Gopalan
9,049,970 B2 6/2015 Dorra
9,162,237 B2 10/2015 Huffington et al.
9,283,144 B2 3/2016 Bickerstaffe et al.
9,528,254 B2 12/2016 Kuang
9,566,593 B2 2/2017 Marty et al.
9,856,637 B2 1/2018 Kontogounis et al.
9,976,293 B2 5/2018 Bickerstaffe
10,086,388 B2 * 10/2018 Gopalan ................. B05B 1/185
10,125,482 B2 11/2018 Hashimoto
10,272,451 B2 4/2019 Ukigai
10,532,367 B2 1/2020 Gopalan
11,347,354 B1 5/2022 Clements
2010/0072307 A1 * 3/2010 Hester ....................... B05B 1/08 239/589.1
2010/0078508 A1 * 4/2010 South ...................... B05B 15/40 239/589
2010/0090036 A1 * 4/2010 Allen ........................ B05B 1/08 239/589.1
2012/0318386 A1 12/2012 Guzman
2014/0151467 A1 * 6/2014 Huffington .............. B05B 1/185 239/548
2015/0238983 A1 * 8/2015 Koklu ..................... F15D 1/009 239/125
2017/0087568 A1 * 3/2017 Nagata .................... B05B 1/185
2017/0087569 A1 * 3/2017 Nagata .................... B05B 15/65
2017/0087570 A1 * 3/2017 Ukigai .................. E03C 1/0408
2017/0130440 A1 5/2017 Novick
2017/0165687 A1 * 6/2017 Ukigai .................... B05B 1/341
2018/0062481 A1 3/2018 Alexander
2019/0255541 A1 * 8/2019 Coplin ...................... F15C 1/22
2021/0023580 A1 1/2021 Lim
2022/0049483 A1 2/2022 Montgomery
2022/0250096 A1 * 8/2022 Hossain .................... F01D 5/16
2022/0266269 A1 * 8/2022 Nakashima ............... B05B 1/08
2022/0339644 A1 * 10/2022 Kolekar .................... B05B 1/08
2022/0410183 A1 * 12/2022 Giusti ....................... B05B 1/14
2023/0264206 A1 * 8/2023 Leavitt ...................... F15C 1/22 239/99
2024/0173728 A1 * 5/2024 Nakashima ............. B05B 17/06

FOREIGN PATENT DOCUMENTS

GB 1472666 A 5/1977
WO 2017092055 A1 6/2017
WO 2018114050 A1 6/2018
WO 2022051605 A1 3/2022

OTHER PUBLICATIONS

Extended European Search Report from European Patent Application No. 24188671.2, dated Mar. 6, 2025, 24 pages.

* cited by examiner

MULTI-HEAD FLUIDIC OSCILLATORS

CROSS-REFERENCE TO RELATED APPLICATION

This application claims priority benefit of Provisional Application No. 63/527,450 filed on Jul. 18, 2023, which is hereby incorporated by reference in its entirety.

FIELD

The present application relates generally to plumbing fixtures with water delivery functionality. More specifically, the present disclosure relates to the application of fluidics devices to improve performance of plumbing fixtures.

BACKGROUND

Commercial and residential plumbing fixtures such as toilets, bidets, faucets, showers, whirlpool tubs, and urinals rely on continuous stream flows (e.g., steady-state flows, etc.) of water to perform working operations. For example, bidets rely on the continuous streams of water to clean a user. Similarly, toilets rely on continuous streams of water from a rim or a sump of a toilet bowl to clean the surfaces of a toilet bowl and remove waste from the toilet bowl during a flush. In another example, faucets and sprayers utilize a continuous stream of water to provide cleaning action. However, continuous stream flows are not always effective at achieving the intended goals of the product. For example, continuous stream flows may not be enough to fully clean surfaces. Larger volumes of water or higher intensity flows may be required to ensure sufficient cleaning capabilities are provided by the plumbing fixtures.

BRIEF DESCRIPTION OF THE DRAWINGS

Objects, features, and advantages of the present disclosure should become more apparent upon reading the following detailed description in conjunction with the drawing figures, in which:

FIG. 1 illustrates a toilet including a tank and FIG. 2 illustrates a tankless toilet according to exemplary embodiments of the present disclosure.

The figures illustrate certain exemplary embodiments of the present disclosure in detail. It should be understood that the present disclosure is not limited to the details and methodology set forth in the detailed description or illustrated in the figures. It should be understood that the terminology used herein is for the purposes of description only and should not be regarded as limiting.

DETAILED DESCRIPTION

The term "plumbing fixture" refers to an apparatus that is connected to a plumbing system of a house, building, or another structure. The term "plumbing fixture" may include toilets, bidets, faucets, showerheads, bathtubs, urinals, and dishwashers. The term "bathroom fixture" and "kitchen fixture" may more specifically refer to individual types of plumbing fixtures found in the bathroom or kitchen, respectively, and these terms may be overlapping in certain examples (e.g., faucets). While each of the fluidic devices described herein may be described as being included in a single type of plumbing fixture, it should be understood that the present disclosure is not limited thereto and that each of the fluidic devices described herein may be included in or used in conjunction with any type of plumbing fixture. For example, a fluidic device described with respect to a bidet may be included or used in conjunction with any of a shower head, a faucet, a toilet, a dishwasher, and the like.

The plumbing fixture includes one or more modular fluid oscillators or structures that are configured to control the flow of water through one or more jets (e.g., fluid outlets, outlet openings, etc.) of the plumbing fixture. The modular fluid oscillators include interconnected flow channels (e.g., passages, etc.) that include geometries which may be altered to selectively control the flow of water ejected from the modular fluid oscillator. For example, the channels may be configured to provide pulsating or oscillating flows of water to achieve improved water delivery performance through the plumbing fixture, which, advantageously, improves the cleaning capabilities of the plumbing fixture. Alternatively, or in combination, the modular fluid oscillators may be configured to control the timing of flow through the one or more jets. Multiple modular fluid oscillators may be interconnected through flow channels as well.

Figure 1:
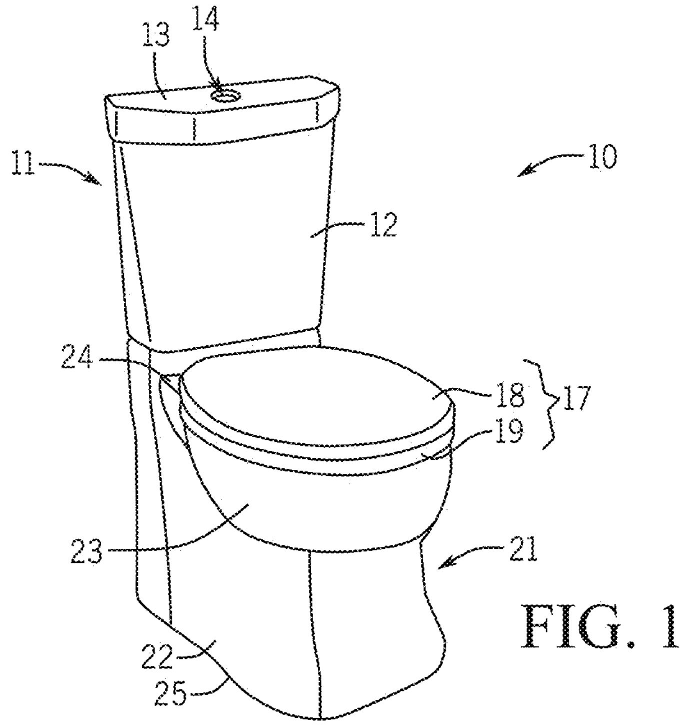
FIGS. 1 and 2 illustrate perspective views of toilets in accordance with examples of the present disclosure. Specifically.
Figure 2:
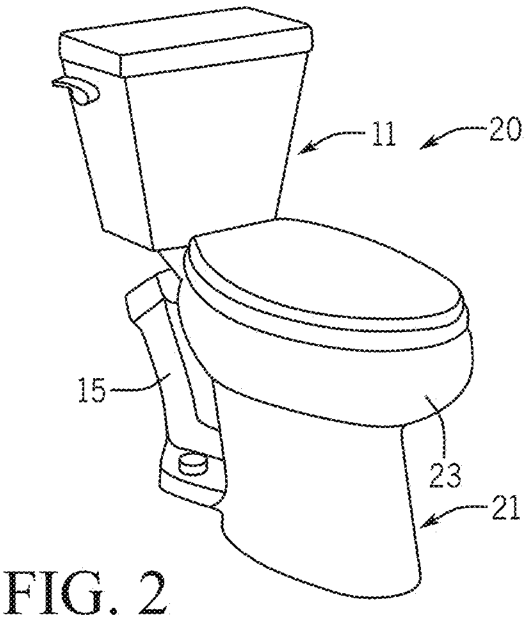

FIGS. 1 and 2 illustrate toilets according to exemplary embodiments of the present disclosure. FIG. 1 illustrates an exemplary embodiment of a skirted toilet 10 that includes a tank 11, a pedestal 21 (or base), and a seat assembly 17. The tank 11 may include a reservoir 12 for storing the water used during operational (or flushing) cycles, a lid (or cover) 13 for providing selective access into the reservoir 12, and an actuator 14 that is configured to initiate an operational cycle when activated. The actuator 14 or flush mechanism may be a button configured to activate when depressed (or pulled) a predetermined distance or when touched, a lever configured to activate when rotated a predetermined angular travel, or any suitable device configured to activate based upon an input manipulation by a user.

It should be noted that the shapes and configurations of the tank, pedestal, seat assembly, and the internal components (including the trapway and other features) may vary from the embodiments shown and described herein, and that the embodiments disclosed herein are not intended as limitations. It should be noted that various components of the toilet may be made of a vitreous material such as clay. It should be noted that various components of the toilet may be polymeric and/or over molded or otherwise fixed to the toilet. It should be noted, for example, that although the exemplary embodiment of the toilet 10 is shown configured with the tank 11 formed separately from the pedestal 21 and later coupled to the pedestal, the tank may be integrally formed with the pedestal as a one-piece design. In other words, the toilet may be a one-piece design, a two-piece design, or have any suitable configuration. The toilet disclosed herein may have a wide variety of skirted toilet configurations, and all such configurations are intended to be encompassed herein. The following description of various toilet features is therefore intended as illustration only of one possible embodiment, and it should be understood by those reviewing the present description that similar concepts or features may be included in various other embodiments.

The tank 11 may include an inlet opening configured to receive water from a coupled water supply, such as from a hose (e.g., line, tube). The tank 11 may also include an inlet valve assembly or other device configured to control the flow of water from the water supply into the tank through the inlet opening. Within the tank 11 may be provided a float device for controlling the inlet valve assembly, such as by opening the valve to refill the reservoir 12 of the tank 11 after an operational cycle and closing the valve when the water in the reservoir 12 reaches a preset volume or height. The tank 11 may also include an outlet opening configured to transfer (e.g., conduct) the water stored in the reservoir 12 of the tank to the pedestal 21 upon activation of the actuator 14. The pedestal 21 may include toilet bowl 23. The tank 11 may include an outlet valve assembly or other device configured to control the flow of water from the reservoir 12 into the pedestal 21 through the outlet opening.

The pedestal 21 (or base) of the toilet 10 may include a wall 22 having any suitable shape that is configured to form a bowl 23 having an opening formed by an upper rim at the top of the opening. The pedestal 21 may also be configured to include a plurality of walls having varying shapes that together form a bowl having an opening formed by a rim. The wall 22 of the pedestal may extend downward and/or rearward from the bowl 23 to form a lower portion 25 configured to support the pedestal 21 and the toilet 10. The lower portion 25 may be formed by the end (e.g., lower rim) of the wall 22, or may include a member that extends generally in a horizontal plane from one or more than one end of the wall. The pedestal 21 may also include a top member 24 that extends between two sides of the wall 22 (or between two opposing walls) and is provided rearward (or behind) the bowl 23, wherein the top member 24 forms a plateau for supporting the tank 11, such as the bottom surface of the reservoir 12 of the tank 11. The top member 24 may include an inlet opening that may be aligned with the outlet opening of the tank 11, such as when the tank 11 is coupled to (or resting above) the pedestal 21, wherein water is selectively transferred (e.g., conducted) from the tank 11 through the outlet opening of the tank to the pedestal 21 through the inlet opening of the pedestal 21, when the toilet is activated through the actuator 14. The outlet valve assembly may control the flow of water from the tank to the pedestal. The toilet may also include a gasket or seal that is provided between the tank 11 and the pedestal 21 to prohibit leaking. For example, a gasket may be provided between the outlet opening of the tank and the inlet opening of the pedestal to prohibit leaking between the tank and the pedestal.

The plateau or upper surface formed by the top member 24 of the pedestal 21 may also provide for coupling of the seat assembly 17 to the pedestal 21 of the toilet 10. For example, the top member 24 may include one or more than one opening, wherein each opening is configured to receive a fastening device (e.g., bolt, screw, etc.) to couple (e.g., attach) the seat assembly 17 to the top member 24 of the pedestal 21. As another example, the top member 24 may include one or more than one fastening device (e.g., bolts, recessed nuts, etc.) integrally formed therein (i.e., already provided connected or coupled to the pedestal 21), wherein the fastening device may be used to couple or secure at least a portion of the seat assembly 17 to the pedestal 21. The seat assembly 17 may include a hinge, hinge shoulders configured to receive a fastener, a seat coupled to the hinge and a cover coupled to the hinge.

The bowl 23 of the pedestal 21 may be configured to include a receptacle (e.g., sump) and an outlet opening, wherein the water and waste is collected in the receptacle until being removed through the outlet opening, such as upon activation of the actuator 14. The pedestal 21 may also include a pedestal internal passageway, such as a trapway, that connects the outlet opening or discharge outlet of the bowl 23 to a drain or soil pipe. The passageway, or trapway, generally includes a first portion, a second portion, and a weir separating the first and second portions. The first portion of the passageway may extend from the outlet opening of the bowl 23 at an upwardly oblique angle to the weir. The second portion of the passageway may extend from the weir downwardly to the exiting device, such as the drain or soil pipe.

Between operational cycles (e.g., flush cycles) of the toilet 10, the water (and waste) is collected in the first portion of the trapway (in addition to the receptacle of the bowl), such that the weir prohibits the water from passing past the weir and into the second portion of the trapway. A flushing cycle may begin upon activation of the actuator 14. Upon activation of the actuator, additional water may be discharged into the bowl 23 of the pedestal 21, resulting in the flushing action and waste removal through the soil pipe. For example, water may be discharged into the bowl from one or more rim outlets located in or below a rim of the toilet and/or a sump jet disposed in a sump (e.g., first part of the trapway) of the toilet. The rim outlets and/or the sump jet may include one or more of the fluidic devices described herein. The flushing cycle may include generation of a siphon to assist the flushing action and waste removal.

The seat assembly 17 may include a cover member 18 (e.g., lid), a seat member 19 (e.g., ring member), and a hinge. The seat member 19 may be configured to include an annular member that encircles an opening, wherein the annular member provides a seating surface for the user of the toilet 10. The seat member 19 may also be pivotally coupled (e.g., attached) to the hinge, wherein the seat member may rotate (or pivot) about the hinge, such as between a first lowered or seated position and a second raised or upright position. The cover member 18 may be configured to be round, oval, or any other suitable shape. Typically, the profile or shape of the outer surface of the cover member will be configured to match (i.e., to be substantially similar) to the profile of the outer surface of the seat member to improve the aesthetics of the seat assembly and toilet. The cover member 18 may also be coupled to the hinge, wherein the cover member may rotate (or pivot) about the hinge, such as between a first lowered or down position and a second raised or upright position. The cover member 18 may be provided above the seat member in the down position to thereby cover the opening of the seat member 19, as well as to conceal the inside of the bowl 23 of the pedestal 21. The cover member 18 may be configured to rest against the outside surface of the tank 11, when the cover member 18 is in the upright position, such that the cover member 18 remains in the upright position in order for a user to sit upon the seat member 19.

FIG. 2 illustrates a non-skirted toilet 20 according to another exemplary embodiment of the present disclosure. The internal components, including the trapway 15, are visible in the pedestal 21 of non-skirted toilet 20. It should be noted that the devices, methods, and systems described herein may include and/or be used with both skirted and non-skirted toilets. It should further be noted that devices, methods, and systems described herein may include or be used with both toilets including tanks and tankless toilets. A waterline may supply a tankless toilet with water during a flush cycle.

Referring generally to FIGS. 1 and 2, the toilets 10, 20 rely on continuous streams of water from a rim or a sump of the toilet to clean the surfaces of the toilet bowl and remove waste from the toilet bowl during a flush. Accordingly, in some examples, streams of water supplied from the rim (e.g., through a rim outlet) and/or streams of water supplied from the sump (e.g., through a sump jet) may be supplied through one or more fluidic devices according to the present disclosure, thereby, improving cleaning (e.g., bowl rinse) and/or waste removal performance of the toilet 10, 20.

Figure 3:
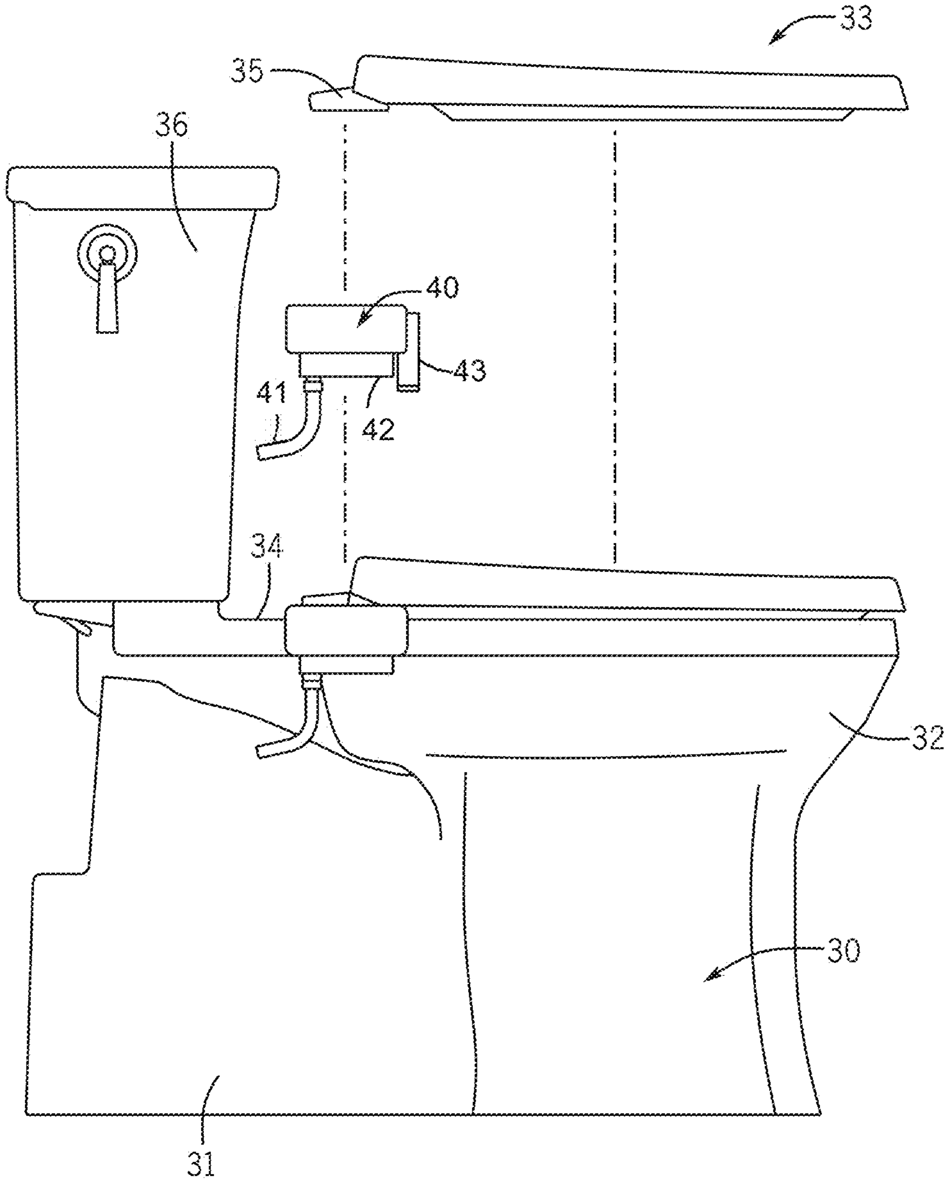
FIG. 3 illustrates a toilet including a bidet assembly in accordance with one example of the present disclosure.

FIG. 3 illustrates a toilet 30 including a bidet assembly 40 in accordance with one example of the present disclosure. As illustrated in FIG. 3, the toilet 30 includes a pedestal 31 having a bowl 32 and a seat assembly 33. As illustrated, the toilet 30 of FIG. 3 includes a tank 36; however, as mentioned above the present disclosure is not limited thereto and a toilet in accordance with one example of the present disclosure may be a tankless toilet. As illustrated in FIG. 3, the bidet assembly 40 may be coupled to an upper surface 34 of the pedestal 31. For example, as illustrated in FIG. 3, the bidet assembly 40 may be disposed between the upper surface 34 of the pedestal 31 and the seat assembly 33. Specifically, a fastener (e.g., bolt, screw, rivet) may extend through a hinge shoulder 35 and a mounting hole of the bidet assembly 40 into the pedestal 31, coupling the bidet assembly 40 and the seat assembly 33 to the pedestal 31.

In some examples, the toilet 30 may be manufactured to include the bidet assembly 40. For example, the pedestal 31 and bidet assembly 40 may be formed as a single integral component. In other examples, the bidet assembly 40 may be manufactured and attached to the pedestal 31 by the toilet's manufacturer. However, it is also envisioned that the bidet assembly 40 can be sold as an after-market add-on product capable of being installed on the toilet by a party other than the toilet's manufacturer.

Referring to FIG. 3, the bidet assembly 40 includes a supply hose 41, a base 42, and a wand 43. The base 42 may be configured to contact the upper surface 34 of the pedestal 31, supporting the bidet assembly 40 when the bidet assembly is installed or coupled to the toilet 30. The base 42 may be comprised of a plastic, such as polypropylene, polyethylene, polycarbonate, or other similar materials. The bidet assembly 40 includes a supply hose 41 configured to supply water to the bidet wand 43. In some examples, the supply hose 41 may be in fluid communication with a tank 36 of the toilet, so as to be supplied with water from the tank 36 during a flush cycle. In some examples, for example, when a tankless or line pressure toilet is used, the supply hose 41 may be in fluid communication with a plumbing system of a house, building or other structure, so as to receive water from the plumbing system. In these examples, a valve may be used to control the flow of water from the plumbing network out of the outlet of the wand 43. In some examples, the base 42 may include a channel formed therein configured to convey or conduct a flow of water from the supply hose 41 to an inlet of the bidet wand 43. A valve may be located, for example, in the base 42 or in the bidet wand 43 to selectively control a flow of water from the plumbing network.

As illustrated in FIG. 3, the bidet assembly 40 includes a wand 43 extending (e.g., downward) from the base 42. In some examples, a flexible or elastic sleeve may be disposed between the base 42 and the wand 43. When the bidet assembly 40 is coupled to the toilet 30, the wand 43 may extend into bowl 32 of the toilet 30. The wand may include an inlet and a wand channel extending from the inlet to a wand outlet configured to dispense water. The wand outlet may be disposed at or near a distal end of the wand. The wand outlet may include one or more fluidics devices described herein configured to condition a flow of water dispensed from the wand outlet. For example, the fluidic device may be configured to provide an oscillating or pulsating flow of water.

The wand 43 of the bidet assembly 40 may be operable to be moved by a user. Specifically, the wand 43 may be moved to change a position of the wand and thus change a position from which water is dispensed from an outlet or outlets of the bidet wand 43. In some examples, the bidet wand 43 may be mechanically coupled to a control interface, e.g., a joystick(s), lever(s), paddle(s), and the like, configured to change a position of the wand 43 by moving one or more links, e.g., levers, cords, and the like, disposed between the control interface and the wand 43. In other examples, one or more electric motors may be configured to change a position of the wand. The one or more electric motors may be connected to a controller. The controller may be connected, either through a wired connection or wirelessly to a user input device, e.g., touch screen, buttons, sensors, and the like, configured to receive one or more instructions for controlling a position of wand 43. The controller may be configured to send one or more signals and/or electric current to the one or more motors to move the wand 43.

Figure 4:
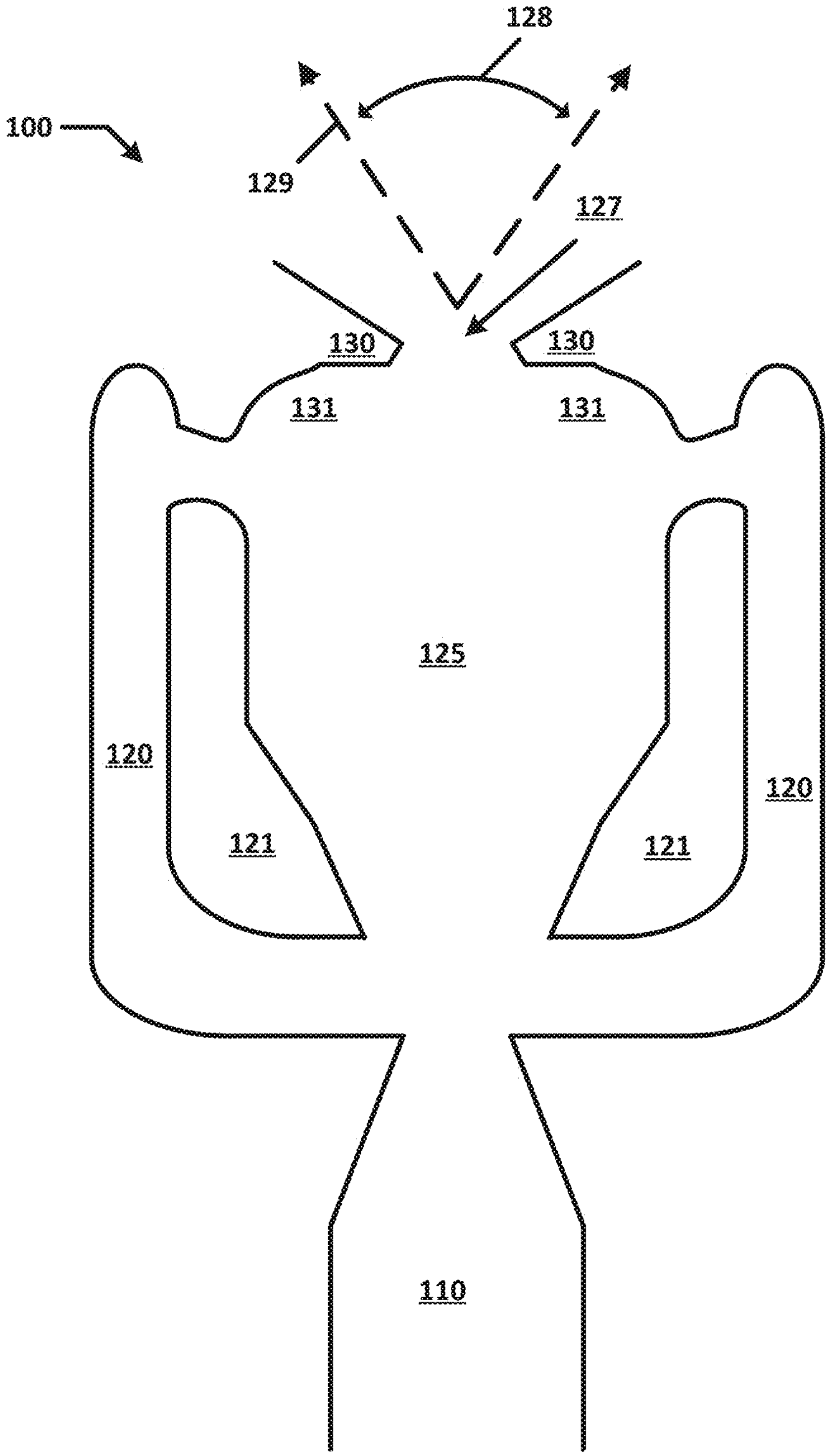
FIG. 4 illustrates a modular fluid oscillator in accordance with one example of the present disclosure.

Referring to FIG. 4, a modular fluid oscillator layout in accordance with an example of the present disclosure is illustrated. Illustrated is an internal cross section of the fluid oscillator 100. The fluid oscillator 100 includes a main flow channel 110, one or more feedback channels 120, an island divider 121, a mixing chamber 125, an outlet 127, and one or more geometric features at the outlet 127 of the fluid oscillator that cause a fan output water flow to oscillate, fluctuate, or pulsate across a predetermined angle range 128. As illustrated in FIG. 4, the repeating pattern of water includes a back and forth pattern about the horizontal direction. However, an orientation of the fluidic device may be changed (e.g., rotated 90 degrees) so as to provide a back and forth pattern about a vertical or another direction. The main flow channel 110 may include a narrowing passage that acts as an amplifier for the velocity of the flow of water. For example, the positions of the islands 121 may be adjusted to create such a narrowing passage and amplifier. Additional, fewer, or different components may be used.

The fluid oscillator 100 includes a main flow channel 110 at least partially parallel to one or more feedback channels 120. As shown in FIG. 4, each of the feedback channels 120 is substantially parallel in part to the main flow channel 110 and each of the feedback channels 120 provides a path in the opposite direction (upstream) of the main flow channel (downstream).

The fluid oscillator 100 includes at least one island divider 121 configured to separate the mixing chamber 125 from each feedback channel 120. As illustrated in FIG. 4, the island divider 121 may partially or fully extend from the bottom to the top of the fluid oscillator 100.

The fluid oscillator 100 includes a mixing chamber 125 in communication with the main flow channel 110 and each of the feedback channels 120. The main flow channel includes a pressurized fluid to create a spatially oscillating (fan sweep back and forth) jet. No power source is required. However, the input fluid (e.g., water supply) is provided under pressure or under with potential energy from gravity. The diameter of the pipe may be selected to increase or decrease the input fluid to a desired pressure. The curved walls of the mixing chamber 125 provide a path for the flow of fluid to exhibit the coanda effect in which the flow attaches itself to the walls of the mixing chamber and changes direction because it remains attached as the curved walls of the mixing chamber 125 curve away from the initial direction from the main flow channel. In addition, or the in the alternative, the mixing chamber 125 provides one or more pockets for a separation flow to form that is triggered from the output from the respective feedback channel 120. The separation flow pushes the main flow away from the walls of the mixing chamber 125 to cause the oscillation to be realized in the output of the fluid oscillator 100.

The fluid oscillator includes one or more geometric features at the outlet that of the fluid oscillator that cause a fan output water flow 129 to oscillate across a predetermined angle range 128. The fluid oscillator 100 is self-sustaining and self-inducing by virtue of the shape of the main flow channel 110, feedback channels 120, the island 121, and/or the mixing chamber 125.

In addition, one or more features of the outlet of the fluid oscillator 100 applies a limiting condition (diffuser) on the fan output water flow 129 to oscillate across the predetermined angle range 128. The limiting condition may be a geometric feature of the outlet of the fluid oscillator 100. In one example, the limiting condition is provided by a geometry including a neck 130 disposed at the outlet 127 of the fluid oscillator 100. The neck 130 limits the predetermined angle range 128 by blocking some of the flow of water that unimpeded would have escaped the mixing chamber 125 to the outlet of the fluid oscillator 100. The neck 130 may also set a particular oscillation frequency due to reflection of the fluid back into the fluid oscillator 100. The neck 130 may be omitted to reveal a larger outlet of the fluid oscillator 100.

In one example, the limiting condition is provided by a geometry including a concave portion 131 configured to reverse the flow outside of the neck 130 internally into the mixing chamber 125. Fluid that otherwise would have flowed to the outlet of the fluid oscillator 100 flows into the concave portion 131 then back into the rotational flow of the mixing chamber 125 as an additional feedback input to the mixing chamber 125. Thus, the concave portion 131 may be referred to as auxiliary feedback for the fluid oscillator 100.

Figure 5:
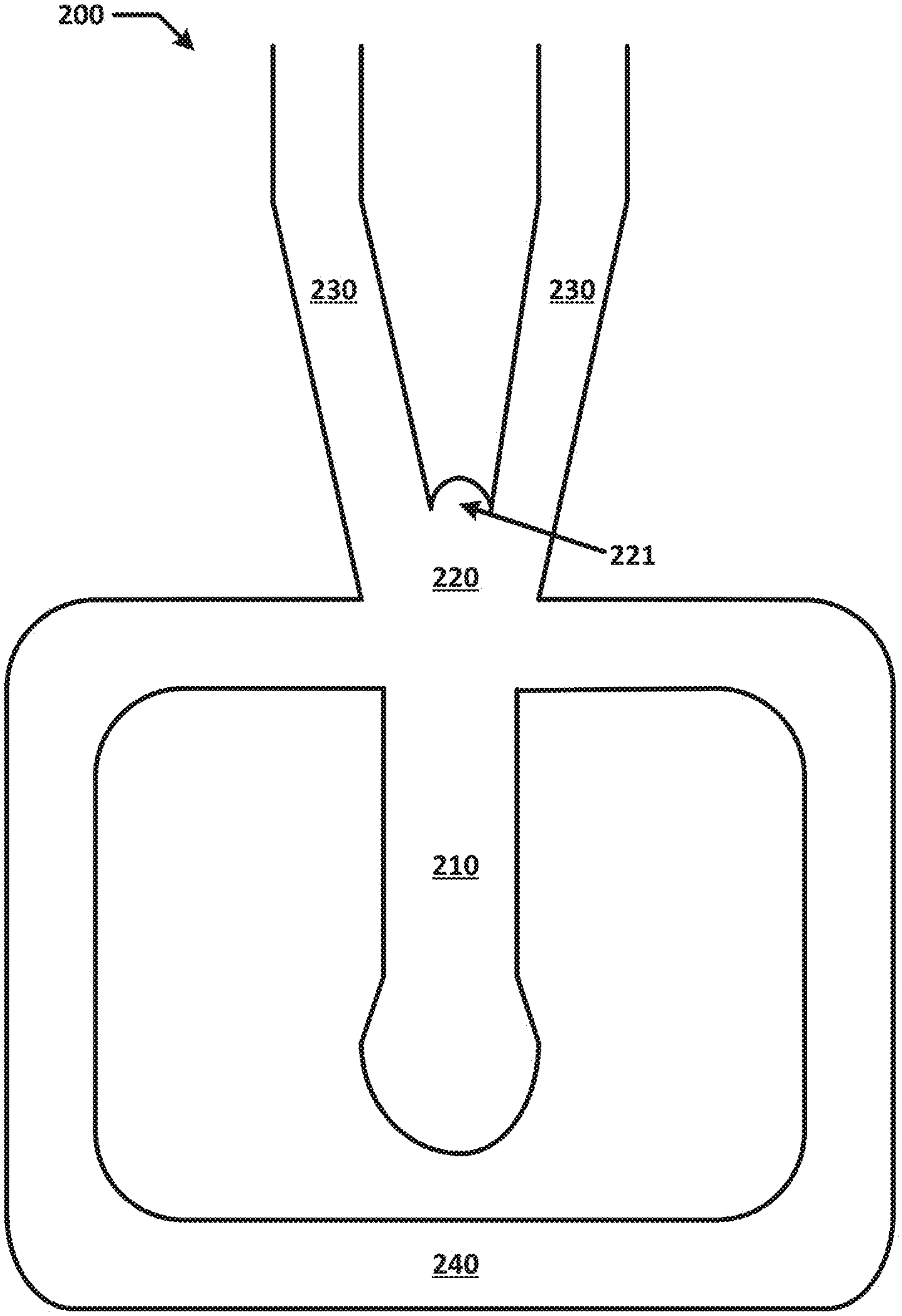
FIG. 5 illustrates a modular fluid oscillator in accordance with another example of the present disclosure.

Referring to FIG. 5, a modular fluid oscillator 200 layout in accordance with another example of the present disclosure is illustrated. Illustrated is an internal cross section of the fluid oscillator. The fluid oscillator 200 includes an inlet channel 210, a junction chamber 220, two outlet channels 230, a resonant channel 240, and one or more geometric features in the junction chamber that cause an output flow of water to oscillate, fluctuate, or pulsate between the outlet channels 230. The repeating pattern of water includes a back and forth pattern between the outlet channels 230. In some examples, the inlet channel may include a narrowing passage that acts as an amplifier for the velocity of the flow of water. Additional, different, or fewer components may be used.

The fluid oscillator 200 includes a junction chamber 220 disposed at an end of the inlet channel 210. The junction chamber 220 is in communication with the inlet channel 210, the outlet channels 230, and the resonant channel 240. The junction chamber 220 includes one or more geometric features, for example, concave portion 221 configured to cause an output flow of water to oscillate between the outlet channels 230.

The fluid oscillator 200 includes a resonant channel 240 in communication with the junction chamber 220. As illustrated in FIG. 5, the resonant channel may be a circular channel fluidly coupled to the junction chamber 220 at two locations across from one another. The inlet channel includes a pressurized fluid to create the spatially oscillating jet. No power source is required. However, the input fluid (e.g., water supply) is provided under pressure or with potential energy from gravity. The diameter of the pipe may be selected to increase or decrease the input fluid to a desired pressure. The curved walls of the concave portion 221 of the junction chamber 220 creates instability in the flow, causing a portion of the flow entering the junction chamber to flow into the resonant channel.

Figure 6:
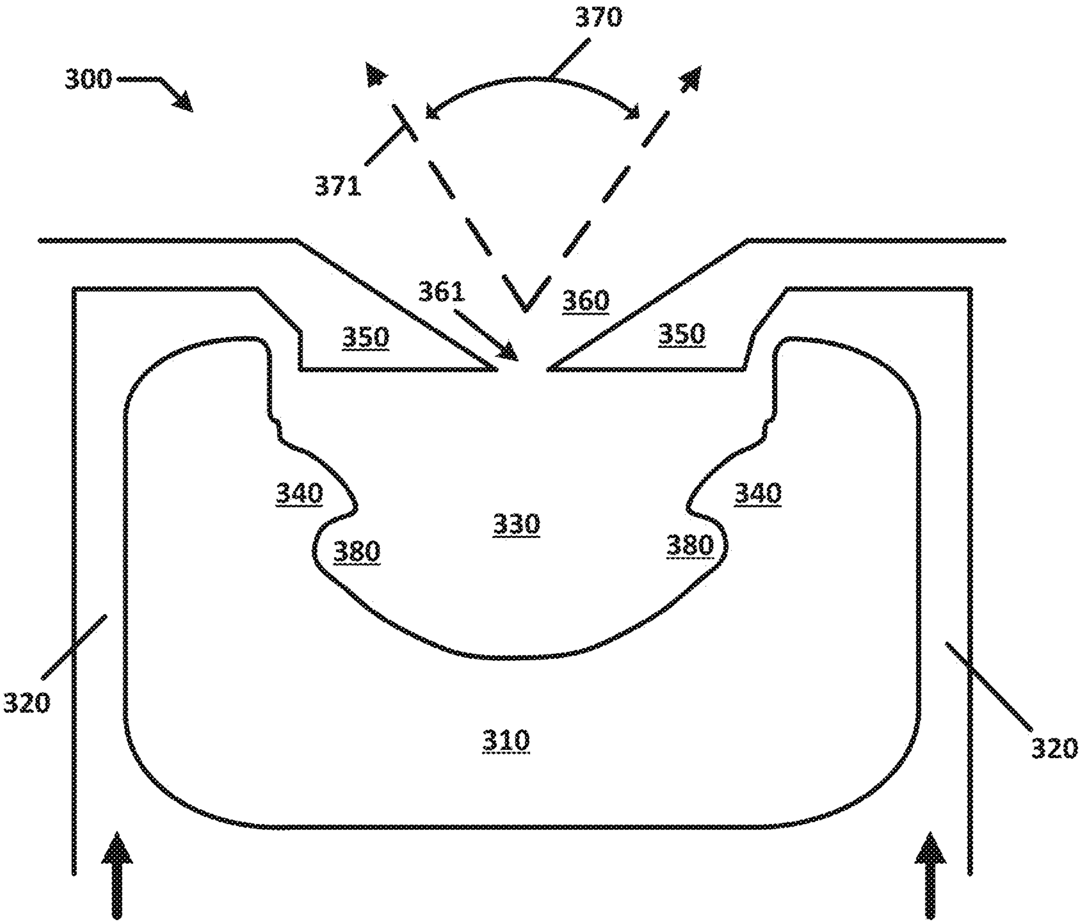
FIG. 6 illustrates a illustrates a modular fluid oscillator in accordance with yet another example of the present disclosure.

Referring to FIG. 6, a modular fluid oscillator 300 in accordance with another example of the present disclosure is illustrated. Illustrated is an internal cross section of the fluid oscillator 300. The fluid oscillator includes an island 310, inlet channels 320, mixing chamber 330, convex walls 340, outlet walls 350, outlet 360, and one or more geometric features at the outlet 360 of the fluid oscillator that cause a fan output of water to oscillate, fluctuate, or pulsate across a predetermined angle range 370. As illustrates in FIG. 6, the repeating pattern of water includes a back and forth pattern about the horizontal direction. However, an orientation of the fluidic device may be changed (e.g., rotated 90 degrees) so as to provide a back and forth pattern about a vertical or another direction. The fluid oscillator 300 includes inlet channels 320 disposed on both sides of the island 310. The inlet channels 320 may include a narrowing passage that acts as an amplifier for the velocity of the flow of water. For example, the position, size, and/or shape of the island 310 may be adjusted to create such a narrowing passage and amplifier. Additional, different, or fewer components may be used.

The fluid oscillator 300 includes an island 310 and an inlet channel 320 disposed on two opposite sides of the island 310. As shown in FIG. 6, the inlet channels 320 may be substantially parallel in part to one another. The inlet channels 320 may both supply a flow of fluid to the mixing chamber 330. Each of the inlet channels may provide a path in the same direction (e.g., upstream).

The fluid oscillator 300 includes an island configured to separate the inlet channels 320 and the mixing chamber 330. As illustrated in FIG. 6, the island 310 may partially or fully extend from the bottom to the top of the fluid oscillator 300.

The fluid oscillator 300 includes a mixing chamber 330 in communication with each of the inlet channels 320. The inlet channels include a pressurized fluid to create a spatially oscillating (fan sweep back and forth) jet. No power source is required. However, the input fluid (e.g., water supply) is provided under pressure or with potential energy from gravity. The diameter of the pipe may be selected to increase or decrease the input fluid to a desired pressure. The curved walls of the mixing chamber 330 provide a path for the flow of fluid to exhibit the coanda effect in which the flow attaches itself to the walls of the mixing chamber 330 and changes directions because it remains attached as the curved walls of the mixing chamber 330 curve away from the initial direction from the inlet channels 320. In addition, or in the alternative, the mixing chamber 330 may include one or more pockets 380 for a separation flow to form that is triggered from an output of a respective inlet channel 320. The separation flow may push a main flow away from the walls of the mixing chamber to cause the oscillation to be realized in the output of the fluid oscillator 300. In addition, or in the alternative, the fluid oscillator 300 may include one or more convex walls 340 that adjust a path of the output of a respective inlet channel 320. The convex walls 340 may direct the flow (e.g., from an inlet channel) into a pocket 380 increasing the separation flow. In some examples, the convex walls may increase the separation flow, and thus, increase a frequency of the output of the fluid oscillator 300.

The fluid oscillator 300 includes one or more geometric features at the outlet of the fluid oscillator that cause a fan output of water flow 371 to oscillate across a predetermined angle range 370. The fluid oscillator 300 is self-sustaining and self-inducing by virtue of the shape of the island 310, the inlet channels 320, and/or the mixing chamber 330.

In addition, one or more features of the outlet 360 of the fluid oscillator 300 applies a limiting condition (diffuser) on the fan output water flow 371 to oscillate across the predetermined angle range 370. The liming condition may be a geometric feature of the outlet of the fluid oscillator 300. In one example, the limiting condition is provided by a geometry including a neck 361 disposed at the outlet 360 of the fluid oscillator 300. In some examples, two outlet walls 350 of the fluid oscillator 300 may define the neck 361 of the fluid oscillator 300. Accordingly, the size and/or shape of the neck 361 may be varied by varying the size, shape, and/or position of the outlet walls 350. The neck 361 may also set a particular oscillation frequency due to reflection of the fluid back into the fluid oscillator 300.

Figure 7:
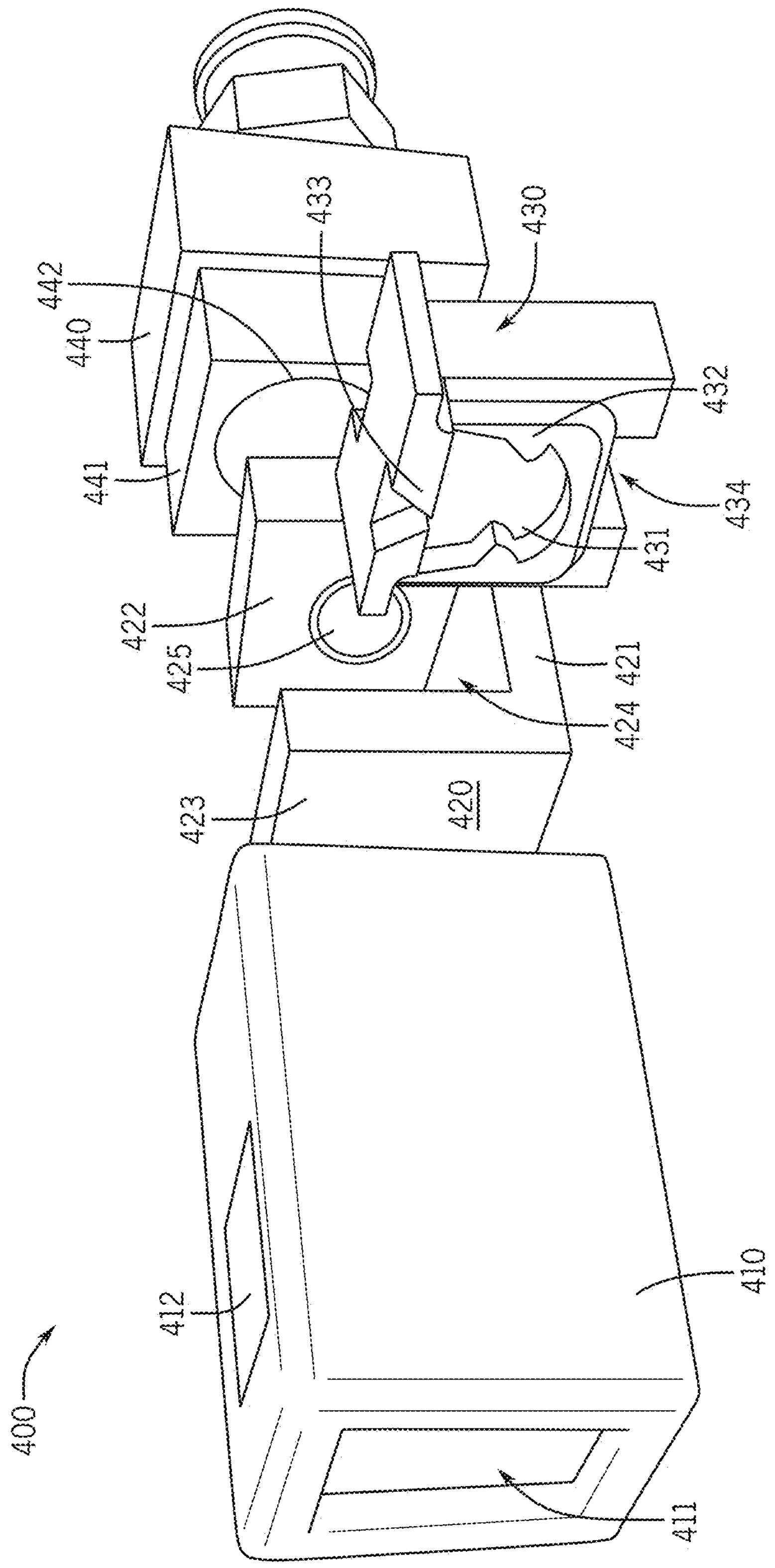
FIG. 7 illustrates a partially exploded view of a fluidic device in accordance with an example of the present disclosure.

Referring to FIG. 7, a fluidic device 400 according to one example of the present is illustrated. The fluidic device 400 includes a housing 410, a receptacle or flexible component 420, and an insert 430. The flexible component 420 and the insert 430 may be disposed in the housing 410 or configured to be inserted into the housing 410. The housing 410, flexible component 420, and the insert 430 may collectively form a fluidic device 400 including one or modular fluid oscillators. For example, the housing 410, flexible component 420, and the insert 430 may form one or more of the fluid oscillators 100, 200, 300 described above.

The housing 410 is configured to receive and conduct (e.g., convey) a flow of fluid. In some examples, as illustrated in FIG. 7, the housing 410 may have a hollow parallelepiped shape. In some examples, as illustrated in FIG. 7, two opposite ends of the housing may be open. In other examples, only one end of the housing may be open. The shape of the housing 410 may vary. For example, the housing 410 may have a hollow cylindrical shape as described below with respect to FIG. 10. The housing 410 includes an internal chamber 411. The flexible component 420 and the insert 430 may be disposed or be configured to be disposed in internal chamber 411 of the housing 410. In some examples, the housing 410 may be comprised of a plastic such as polypropylene, polyethylene, polycarbonate, or other similar materials.

In some examples, the fluidic device 400 may further include an inlet or supply component 440. The supply component 440 may include a tapered portion 441 configured to be inserted into the internal chamber 411 of the housing 410. In some examples, an interference fit connection may be used to couple the supply component 440 and the housing 410. For examples, the tapered portion 441 of the supply component 440 may be press fit or snap fit into the internal chamber 411 of the housing 410. A water tight seal may be formed when the tapered portion 441 of the inlet or supply component is inserted into the housing 410. For example, tolerance stacking may be used to ensure a water-tight seal between the supply component 440 and the housing 410. The inlet or supply component 440 includes a conduit 442 or channel configured to supply fluid (e.g., a flow of water) into the internal chamber 411 of the housing 410. In some examples, the conduit 442 may include a narrowing passage that acts as an amplifier for the velocity of the flow of fluid into the internal chamber 411.

Figure 8:
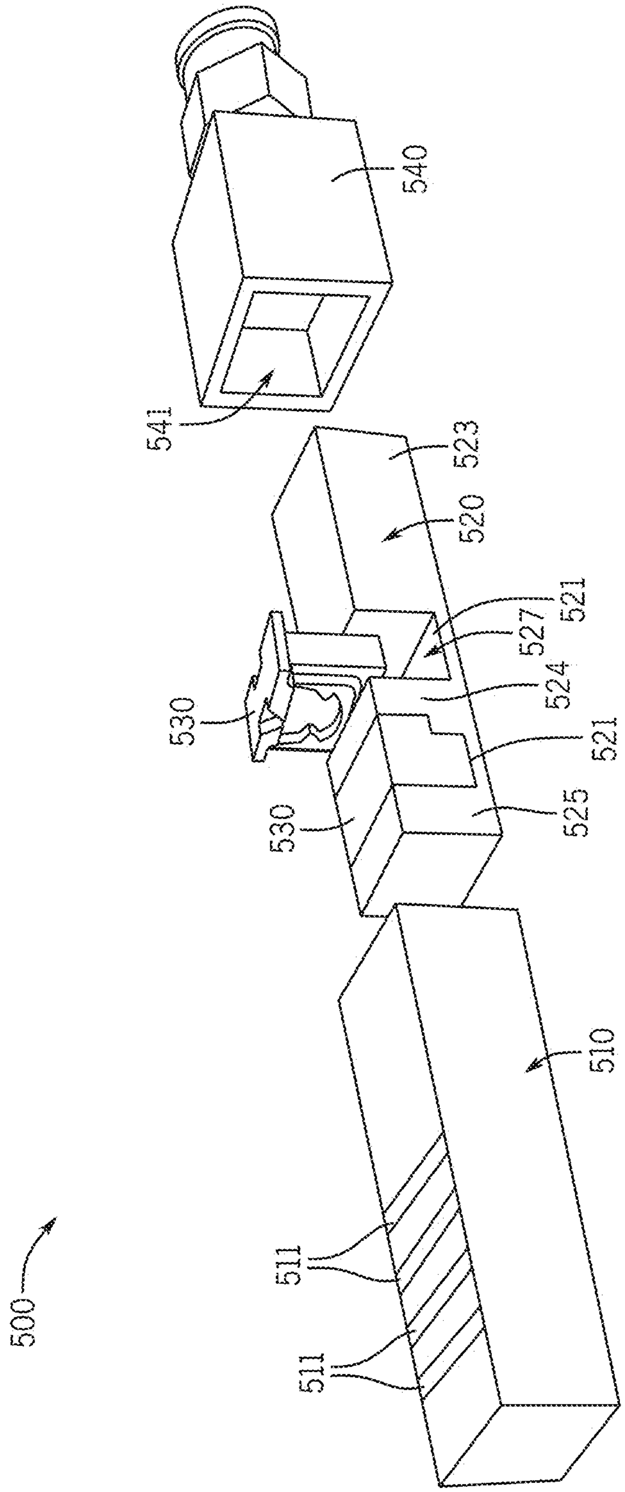
FIG. 8. Illustrates a partially exploded view of a fluidic device in accordance with an example of the present disclosure.

The receptacle or flexible component 420 may be disposed or configured to be disposed in the internal chamber 411 of the housing 410. In some examples, as illustrated in FIG. 8, the receptacle or flexible component 420 may be substantially u-shaped including a base 421, a first leg 422 extending from the base 421, and a second leg 423 extending from the base 421. The receptacle or flexible component may include a hollow section 424 disposed between the first leg 422 and the second leg 423. The hollow section 424 may be configured to receive the insert 430. The flexible component 420 may include an opening 425, passage, or channel extending through the first leg 422. The opening 425 may be configured to conduct a flow of fluid, for example, from the internal chamber 411 of the housing 410 into the hollow section 424 of the flexible component 420. The size, shape, and location of the opening 425 may vary. In some examples, the opening may be circular and extend through the first leg 422 at or near a center of the first leg 422. In another example, the opening may be rectangular and extend through the first leg at or near a bottom of the first leg 422 (e.g., proximate to the base 421). In some examples, as illustrated in FIG. 7, the second leg 423 may not include any openings extending therethrough.

The receptacle or flexible component 420 may be comprised of a first material. For example, the flexible component 420 may be comprised of a rubber, silicone rubber, a flexible polyvinyl chloride (PVC) or rubber-like resin. For example, the flexible component may be comprised of a thermoplastic elastomer (TPE) such as thermoplastic vulcanizate (TPV), styrenic block copolymers (TPE-S), thermoplastic polyolefins (TPE-O), thermoplastic polyurethanes (TPE-U), thermoplastic copolyesters (TPE-E), melt processable rubber (MPR), thermoplastic polyether block amides (TPE-A), ethylene vinyl acetate (EVA) or a combination thereof.

The insert 430 may be disposed in the housing 410 or may be configured to be disposed in the housing 410. Specifically, the insert 430 may be disposed in the hollow section 424 of the receptacle or flexible component 420 or may be configured to be inserted into the hollow section 424. In some examples, as illustrated in FIG. 7, the insert 430 may be fully disposed in the flexible component 420. In other examples, only a portion of the insert 430 may be disposed or configured to be disposed in the flexible component 420.

The size and shape of the insert 430 may vary. In some examples, as illustrated in FIG. 7, the insert 430 may have a prism or parallelepiped shape. In other examples, the insert may have a cylindrical shape. The insert 430 includes at least one surface 431 or face including one or more walls 432 protruding therefrom. The one or more walls 432 may form elements or features of a modular fluid oscillator (e.g., 100, 200, 300) on the surface 431 of the insert 430. For example, the walls 432 may form the channels or passageways of one of the modular fluid oscillators 100, 200, 300. Specifically, the insert 430 and the one or more walls 432 may form a portion of a modular fluidic oscillator. A surface 431 of the insert 430 including the one or more walls 432 may be disposed adjacent to a surface of one of the first leg 422 or the second leg 423. Accordingly, the insert 430 including the one or more walls 432 and the flexible component 420 may collectively form a modular fluid oscillator (e.g., 100, 200, 300). Specifically, the insert 430 including the walls 432 and the flexible component 420 may define the flow path(s) of the modular fluid oscillator (e.g., 100, 200, 300).

The housing 410 is configured to receive the receptacle or flexible component 420 and the insert 430. In some examples, the housing 410 in combination with the flexible component 420 and the insert 430 may define the flow path(s) of the modular fluid oscillator (e.g., 100, 200, 300). Specifically, in some examples, the housing 410 may define one or more walls or features of the modular fluid oscillator (100, 200, 300). Additionally, the housing 410 may be configured to secure or maintain a position of the flexible component 420 and the insert 430 within the housing 410. Specifically, the housing 410 may maintain a position of the flexible component 420 and the insert 430 when the housing 410, flexible component 420, and the insert 430 are under the pressure of fluid supplied to the fluidic device 400.

When the receptacle or flexible component 420 and the insert 430 are inserted into the housing 410 a watertight seal may form between the housing 410, the flexible component 420, and the insert 430. For example, tolerance stacking may be used to ensure a water tight seal between housing 410, flexible component 420, and the insert 430. In some examples, the flexible component 420 may be configured to deform when it is inserted into the housing 410. In some examples, the flexible component 420 may deform to provide a watertight seal between the housing 410, flexible component 420, and the insert 430.

In some examples, as illustrated in FIG. 7, the insert 430 may include two or more surfaces 431 including walls 432 protruding therefrom that form elements or features of a modular fluid oscillator. In some examples, as illustrated in FIG. 7, in some examples, the surfaces 431 may be disposed on opposite sides of the insert 430. Each of the two or more surfaces 431 may be disposed adjacent to and/or abut a surface of a leg (e.g., 422, 423) of the flexible component 420. In these examples, the insert 430 may include one or more recesses or ducts 434 configured to convey a flow of fluid around the insert 430, for example, from a first surface 431 including one or more walls 432 configured to form elements of a modular fluid oscillator to a second surface 431 including one or more walls 432 configured to form elements of a modular fluid oscillator. In some examples, the recesses or ducts 434 may be configured to convey a flow of fluid to opposite sides of the insert 430. Each of the surfaces 431 including walls 432 may further include outlet features 433 configured to form an outlet of the modular fluid oscillator (e.g., 100, 200, 300). Each of the surface 431 including walls 432 may be configured to form a modular fluid oscillator in conjunction or combination with the flexible component 420 and/or the housing 410.

The insert 430 may be comprised of a second material. For example, the insert 430 may be comprised of a plastic such as polypropylene, polyethylene, polycarbonate, or other similar materials. The second material may have a higher durometer than the first material.

The housing 410 may further include an outlet opening 412 extending from the internal chamber 411 of the housing 410 to an exterior of the housing 410. When the flexible component 420, the insert 430, and/or the inlet or supply component 440 are inserted into the housing 410, an outlet of each of the modular fluid oscillators formed by the flexible component 420, insert 430, and/or housing 410 may be disposed adjacent to the outlet opening 412 formed in the housing 410. Specifically, fluid dispensed from an outlet (e.g., comprised of outlet features 433) of each of the one or more modular fluid oscillators may travel (e.g., be dispensed) through the outlet opening 412 of the housing 410.

Referring to FIG. 7, the inlet or supply component 440 may receive a flow of fluid under pressure or with potential energy from gravity. The supply component 440 may convey the flow of fluid to an internal chamber 411 of the housing 410. The flexible component 420 and the insert 430 may be disposed in the internal chamber 411. The flow of fluid may travel through the internal chamber 411 of the housing 410 and the opening 425 or channel extending through the first leg 422 of the flexible component 420 into the hollow section 424 of the flexible component 420. The insert 430 may be disposed in the hollow section 424 of the flexible component 420. After flowing into the hollow section 424, the flow of fluid may travel through the one or more modular fluid oscillators formed by the insert 430, the flexible component 420, and/or the housing 410. In some examples, the fluid may flow through a single fluid oscillator disposed along a single surface 431 of the insert 430. In other examples, the fluid may flow through two fluid oscillators disposed along opposite surfaces 431 of the insert 430. The fluid may flow through a recess or duct 434 in the insert to reach the second fluid oscillator. A spatially oscillating flow of water may be dispensed from each fluid oscillator. The oscillating flow of water dispensed from each fluid oscillators may be dispensed through the outlet opening 412 of the housing 410 to an exterior of the housing.

In some examples, the fluidic device 400 illustrated in FIG. 7 may be configured as a bidet wand. For example, the fluidic device 400 may be configured as the bidet wand 43 of the bidet assembly 40 described above with respect to FIG. 3. Specifically, the fluidic device 400 may extend from a base (e.g., base 42) of a bidet assembly into a bowl (e.g., bowl 32) of a toilet. In other examples, the fluidic device 400 may be configured as a faucet, showerhead, or the like. However, the present disclosure is not limited thereto and the fluidic device 400 may be configured as a different plumbing fixture.

Figure 9:
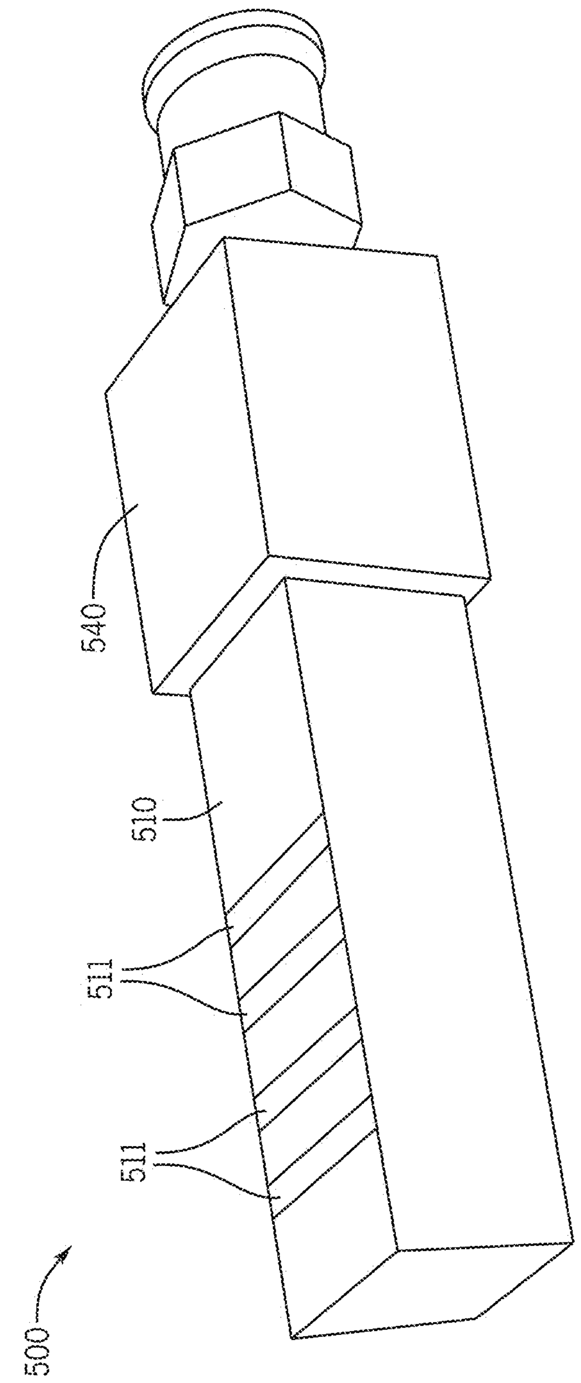
FIG. 9 illustrates the fluidic device of FIG. 8 in accordance with an example of the present disclosure.

Referring generally to FIGS. 8 and 9, a fluidic device 500 in accordance with another example of the present disclosure is illustrated. FIG. 8 illustrates a partially exploded view of the fluidic device 500, while FIG. 9 illustrates the fluidic device 500 in an assembled state. The fluidic device 500 includes a housing 510, a receptacle or flexible component 520, inserts 530, and a supply conduit or component 540. The fluidic device 500 may operate in substantially the same manner as the fluidic device 400 described above with respect to FIG. 7; however, the receptacle or flexible component 520 includes two hollow sections, each of which is configured to receive an insert 430. As described above with respect to FIG. 7, the housing 510, flexible component 520, and the inserts 530 of the fluidic device 500 may collectively form one or more modular fluid oscillators.

The housing 510 may be substantially similar to the housing 410 described above with respect to FIG. 7; however, the housing 510 includes four outlet openings 511-514. Each of the outlet openings 511-514 may be disposed adjacent or proximate to an outlet of a module fluid oscillator formed by the flexible component 520, inserts 530, and housing 510. A spatially oscillating flow of water dispensed from each fluid oscillator may be dispensed through a different outlet opening 511-514 in the housing 510.

The receptacle or flexible component 520 may be substantially similar to the flexible component 420 described above with respect to FIG. 7. The receptacle or flexible component 520 includes a first leg 523, a second leg 524, and a third leg 525 extending from a base 521 of the flexible component 520. Each of the first leg 523 and the second leg 524 may include an opening, passage, or channel (e.g., opening 425) extending therethrough. The opening or channel may be the same as the opening 425 discussed above with respect to FIG. 7. Each of the openings may be configured to convey a flow of water. For example, an opening extending through the first leg 523 may be configured to convey a flow of water from an internal chamber of the housing 510 to a hollow section 527 disposed between the first leg 523 and the second leg 524 and the opening extending through the second leg 524 may be configured to convey a flow of water from the hollow section 527 disposed between the first leg 523 and the second leg 524 to the hollow section 527 disposed between the second leg 524 and the third leg 525. Each of the hollow sections 527 may be configured to receive an insert 530.

The inserts 530 may be the same as the insert 430 described above with respect to FIG. 7. Specifically, each of the inserts 530 may include one or more surfaces including one or more walls extending therefrom, the one or more walls forming elements or features of a modular fluid oscillator (e.g., fluid oscillator 100, 200, 300). In some examples, each surface of the insert including walls forming elements or features of a fluid oscillator may be adjacent to a surface of the first leg 523, second leg 524, or third leg 525. As illustrated in FIG. 8, an insert 530 may be disposed between the first leg 523 and the second leg 524 and another insert may be disposed between the second leg 524 and the third leg 525.

In some examples, the fluidic device 500 may further include an inlet or supply conduit or component 540. The supply conduit or component 540 may be substantially similar to the supply component 440 described above with respect to FIG. 7. However, instead of including a tapered portion configured to be inserted into a housing, the supply conduit or component 540 may include a hollow interior 541 configured to receive the housing 510. In other words, the housing 510 (including the flexible component 520 and the inserts 530) may be inserted into the hollow interior 541 of the supply component 540, coupling the supply component 540 and the housing 510.

FIG. 9 illustrates the fluidic device 500 in an assembled state. In the assembled state the inserts 530 are disposed in the hollow sections 527 of the flexible component 520 and the flexible component 520 is disposed in the internal chamber of the housing 510. When the inserts 530 and flexible component 520 are inserted in the housing 510 each of the outlets of the fluid oscillators (e.g., formed in part by the outlet features) may be disposed adjacent to one of the outlet openings 511-514 of the housing 510.

Figure 10:
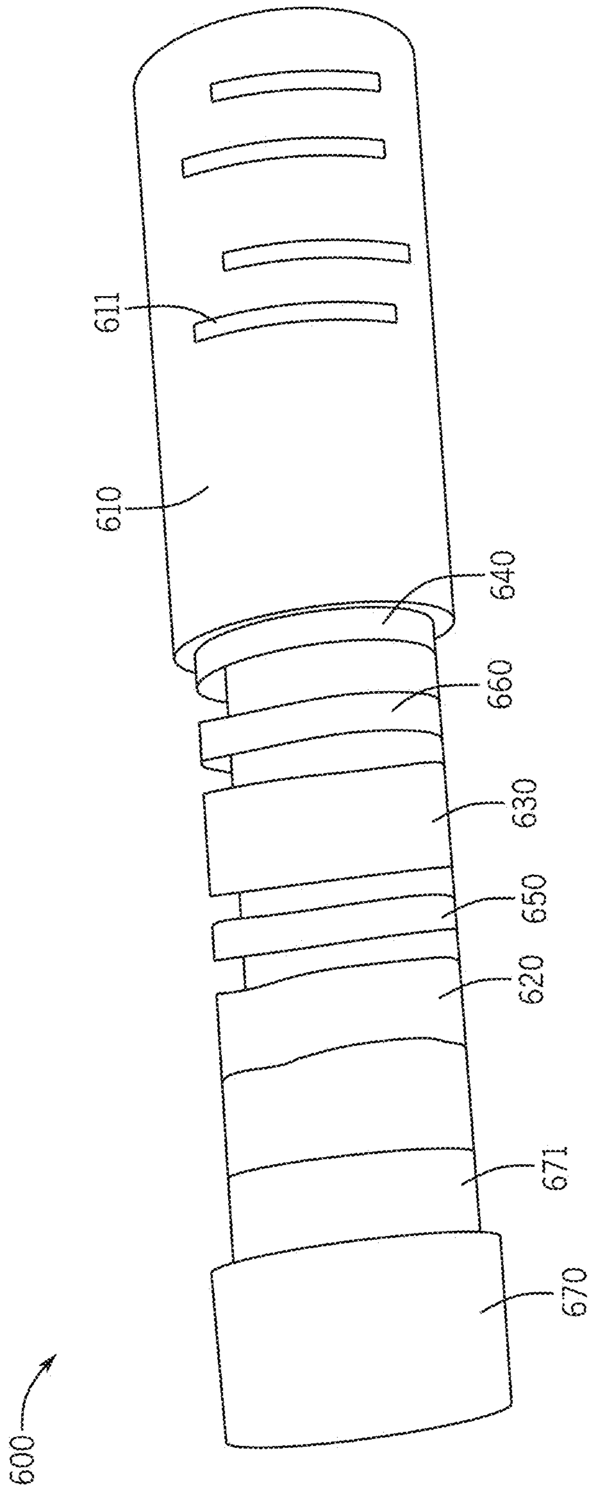
FIG. 10 illustrates a partially exploded view of a fluidic device in accordance with one example of the present disclosure.
Figure 11:
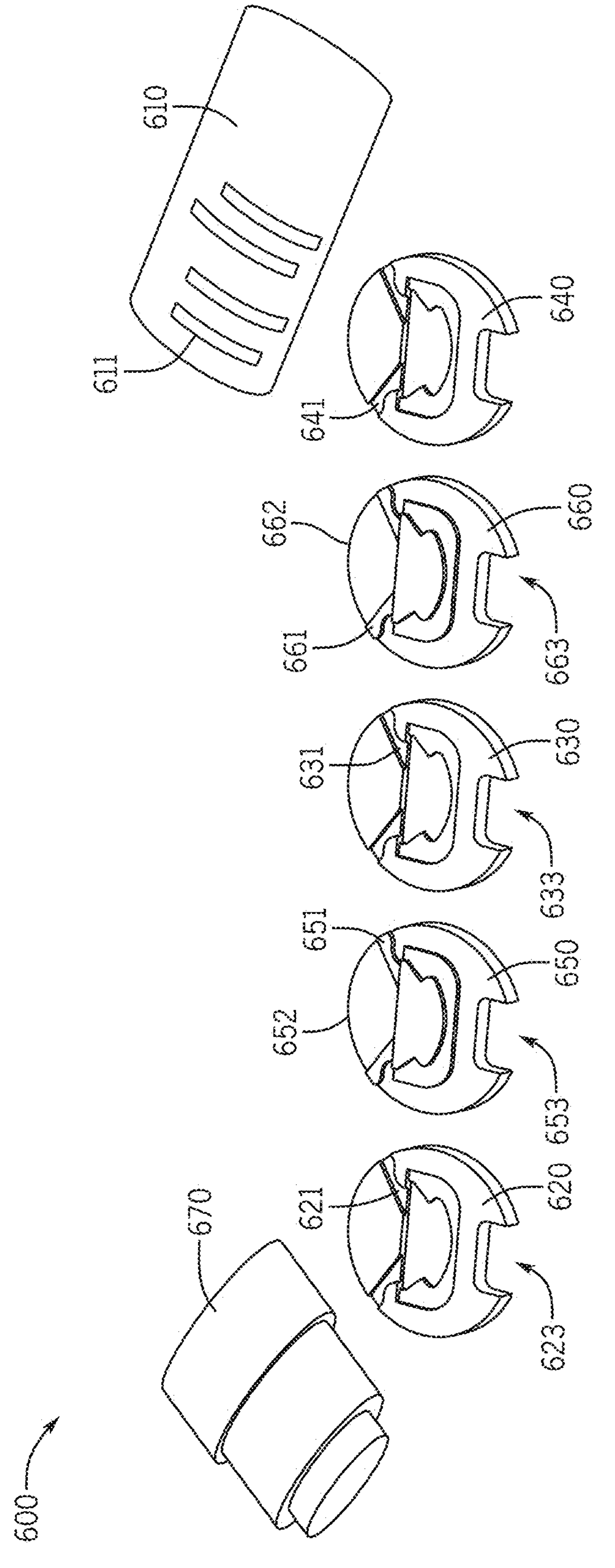
FIG. 11 illustrates the fluidic device of FIG. 10 in a disassembled state in accordance with one example of the present disclosure.

Referring generally to FIGS. 10 and 11, a fluidic device 600 in accordance with another example of the present disclosure is illustrated. FIG. 10 illustrates the fluidic device 600 in a partially exploded state. FIG. 11 illustrates the fluidic device 600 in a disassembled state. The fluidic device 600 includes a housing 610, receptacles or flexible components 620, 630, 640, inserts 650, 660, and inlet or supply component 670. The receptacles or flexible components 620, 630, 640 and the inserts 650, 660 may be disposed in the housing 610 or may be configured to be inserted into the housing 610. The housing 610, receptacles or flexible components 620, 630, 640, and the inserts 650, 660 may collectively form the fluidic device 600 including one or more modular fluid oscillators. For example, the housing 610, receptacles or flexible components 620, 630, 640, and the inserts 650, 660 may form one or more of the modular fluid oscillators 100, 200, 300 described above. As illustrated in FIG. 10, the flexible components 620, 630, 640 and the inserts 650, 660 may be alternatingly stacked with one another to form the one or more modular fluid oscillators 100, 200, 300. The flexible components 620, 630, 640 and inserts 650, 660 may be inserted or disposed in the housing 610 so that the housing 610, flexible components 620, 630, 640, and insert sealingly engage with one another.

The housing 610 is configured to receive and conduct (e.g., convey) a flow of fluid. The housing 610 may receive and convey a flow of fluid through an internal chamber of the housing 610. The size and/or shape of the housing 610 may vary. In some examples, as illustrated in FIGS. 10 and 11, the housing 610 may have a hollow cylindrical shape. In other examples, the housing may have a hollow parallelepiped shape. Other shapes of the housing 610 are possible. In some examples, as illustrated in FIGS. 10 and 11, two opposite ends of the housing may be open. In other examples, only one end of the housing may be open. The housing 610 includes an internal chamber. The internal chamber may be configured to receive the receptacles or flexible components 620, 630, 640, and the inserts 650, 660. In some examples, one or more outlets 611 may extend through the housing 610. The flow of water may be dispensed from the fluidic device through the one or more outlets 611. In some examples, the number of outlets 611 may correspond to the number of modular fluid oscillators included in the fluidic device. In some examples, the housing 610 may be comprised of a plastic such as polypropylene, polyethylene, polycarbonate, or other similar materials.

In some examples, the fluidic device 600 may further include an inlet or supply component 670. The inlet or supply component 670 may include a tapered portion 671 configured to be inserted into the internal chamber of the housing 610, coupling the supply component 670 and the housing 610. A water tight seal may be formed when the tapered portion 671 of the supply component is inserted into the housing 610. For example, tolerance stacking may be used to ensure a watertight seal between the supply component 670 and the housing 410. The inlet or supply component 670 includes a conduit or channel configured to supply fluid (e.g., a flow of water) into the internal chamber of the housing 610. In some examples, the conduit may include a narrowing passage that acts as an amplifier for the velocity of the flow of fluid into the internal chamber of the housing 610.

The receptacles or flexible components 620, 630, 640 and the inserts 650, 660 may be disposed in the housing. Specifically, the receptacles or flexible components 620, 630, 640 and the inserts 650, 660 may be disposed in an internal chamber of the housing 610. Tolerance stacking may be used to achieve a watertight seal between the housing 610, receptacles or flexible components 620, 630, 640, and the inserts 650, 650 when the flexible components 620, 630, 640 and the inserts 650, 660 are disposed in the housing 610. In some examples, the flexible components 620, 630, 640 may deform to achieve a watertight seal.

As illustrated in FIG. 11, the receptacles or flexible components 620, 630, 640 may have a substantially circular cross-sectional shape. In other examples, the flexible components 620, 630, 640 may have a different cross-sectional shape, for example, a rectangular, or a square cross-sectional shape.

The receptacles flexible components 620, 630, 640 may include one or more surfaces having a cavity or cavities formed therein. For example, as illustrated in FIG. 11, first flexible component 620 may include cavity 621, second flexible component 630 may include cavity 631, and third flexible component 640 may include cavity 641. The cavities 621, 631, and 641 may each have at least one side surface and at least one interior surface (e.g., back wall) which define a size and shape of the respective cavity 621, 631, 641. In some examples, each surface of a flexible component adjacent to an insert may include a cavity or cavities formed therein. Each of the cavities may form or define one or more features of a modular fluid oscillator (e.g., 100, 200, 300) and/or may be configured to receive a portion of an insert. In some examples, a portion of the insert may be press fit into the cavity, for example, creating a watertight connection between the cavity and insert. In some examples, a cavity may be formed on a single side of the flexible component. In other examples, a cavity may be formed on two or more surfaces of the flexible component. For example, cavities may be formed on opposite sides of the flexible component adjacent to inserts (e.g., 650, 660). In some examples, in addition to defining one or more features of a modular fluidic oscillator, the cavity 621, 631, 641 may be configured to receive a portion of an insert 650, 660. For example, a cavity 621, 631 may be configured to receive wall protruding from the insert 650, 660 configured to define a feature or element of a modular fluidic oscillator (e.g., 100, 200, 300). In some examples, a modular fluid oscillator may be formed by an interface between an adjacent flexible component and insert.

Additionally, in some examples, one or more of the receptacles or flexible components 620, 630, 640 may include an opening, channel, or passage (e.g., 623, 633, 643) extending therethrough. For example, first flexible component 620 may include passage 623 and second flexible component 630 may include passage 633. The passages 623, 633 may be configured to convey or conduct a flow of water, for example, from the internal chamber of the housing, or another passage to one or more modular fluidic oscillators. The flexible components 620, 630, 640 may be comprised of a first material. For example, the flexible components 620, 630, 640 may be comprised of a rubber, silicone rubber, a flexible polyvinyl chloride (PVC) or rubber-like resin. For example, the flexible components 620, 630, 640 may be comprised of a thermoplastic elastomer (TPE) such as thermoplastic vulcanizate (TPV), styrenic block copolymers (TPE-S), thermoplastic polyolefins (TPE-O), thermoplastic polyurethanes (TPE-U), thermoplastic copolyesters (TPE-E), melt processable rubber (MPR), thermoplastic polyether block amides (TPE-A), ethylene vinyl acetate (EVA) or a combination thereof.

The inserts 650, 660 may be disposed in the housing 610. In some examples, each insert 650, 660 may be disposed adjacent to a receptacle or flexible component 620, 630, 640. In some examples, each insert 650, 660 may be disposed between two flexible components (e.g., 620, 630, 640). A modular fluid oscillator may be formed at the interface between adjacent inserts (e.g., 650, 660) and flexible components (e.g., 620, 630, 640). The inserts 650, 660 may include one or more surfaces including walls 651, 661 protruding therefrom. As illustrated in FIG. 11, the first insert 650 may include walls 651 extending from surface 652 of the insert 650 and the second insert 660 may include walls 661 extending from surface 662 of the insert 660. The walls 651, 661 may define or form elements or features of a modular fluid oscillator 100, 200, 300. In some examples, the one or more walls 651, 661 may also be configured to be disposed in a cavity 621, 631, 641 formed in a flexible component 620, 630, 640. In some examples, the walls 651, 661 may be disposed adjacent to a surface of the flexible components 620, 630, 640 forming a modular fluid oscillator (e.g., 100, 200, 300). The one or more walls 651, 661 of the insert 650, 660 may be configured to engage the cavity 621, 631, 641 so as to form a water tight seal with the flexible component 620, 630, 640.

In some examples, only a single surface of the of the insert may include walls protruding therefrom. In other examples, the insert may include two surfaces having walls protruding therefrom. A surface or surfaces of the insert adjacent to a receptacle or flexible component may walls protruding therefrom configured to form or define one or more elements or features of a modular fluid oscillator and/or be configured to be inserted into a cavity of the flexible component.

In some examples, the receptacles or flexible components 620, 630, 640 and the inserts 650, 660 may disposed in the housing 610 and the housing 610 may maintain or secure a position of the flexible components 620, 630, and 640 and the inserts 650, 660 relative to one another and relative to the housing 610. For example, tolerance stacking of the receptacles or flexible components 620, 630, 640, inserts 650, 660, and/or housing 610 may be used to create a watertight seal between the flexible components 620, 630, 640, the inserts 650, 660, and the housing 610. In some examples, the inserts 650, 660 may includes recesses or ducts 653, 663 configured to convey a flow of fluid. The ducts 653, 663 may be configured to convey a flow of water through an insert 650, 660, for example, to a modular fluid oscillator.

In some examples, as illustrated in FIGS. 10 and 11, the fluidic device 600 may include three receptacles or flexible components 620, 630, 640 and two inserts 650, 660 and may be configured to form four modular fluid oscillators (e.g., 100, 200, 300); however, the present disclosure is not limited thereto. For example, a modular fluidic oscillator may include a single flexible component and a single insert configured to form a single modular fluid oscillator at the interface between the flexible component and the insert. A fluid oscillator according to the present disclosure may include any number of flexible components and/or inserts. In some examples, as illustrated in FIG. 11, the fluidic device may include one more flexible component than insert.

Referring to FIGS. 10 and 11, the inlet or supply component 670 may receive a flow of fluid under pressure or with potential energy from gravity. The supply conduit 670 may convey the flow of fluid to an internal chamber of the housing 610. One or more receptacles or flexible components (e.g., 620, 630, 640) and one or more inserts (e.g., 650, 660) may be disposed in the internal cavity of the housing 610. The flow of fluid may travel through the internal chamber of the housing 610 and a passage 623 of the flexible component (e.g., 620, 630, 640). The flow of fluid may travel through one or more modular fluid oscillators formed at an interface between a flexible component and an insert, by the flexible component, the insert, and the housing. In some examples, the flow of fluid may travel through a single modular fluid oscillator at an interface between the flexible component and the insert. In another example, the flow of fluid may between two or more modular fluid interfaces formed at interfaces between a flexible component and an insert. The flow of fluid may travel through one or more passages (e.g., 623, 633, 643) in flexible components and one or more ducts 653, 663 in the inserts before flowing to one or more of the modular fluid oscillators. A spatially oscillating flow of water may be dispensed from each fluid oscillator. The oscillating flow of water dispensed from each fluid oscillator may be dispensed through an outlet opening 611 in the housing 610 to an exterior of the housing.

In some examples, the fluidic device 600 illustrated in FIGS. 10 and 11 may be configured as a bidet wand. For example, the fluidic device 600 may be configured as the bidet wand 43 of the bidet assembly 40 described above with respect to FIG. 3. Specifically, the fluidic device 600 may extend from a base (e.g., base 42) of a bidet assembly into a bowl (e.g., bowl 32) of a toilet. In other examples, the fluidic device 600 may be configured as a faucet, showerhead, or the like. However, the present disclosure is not limited thereto and the fluidic device 600 may be configured as a different plumbing fixture.

Figure 12:
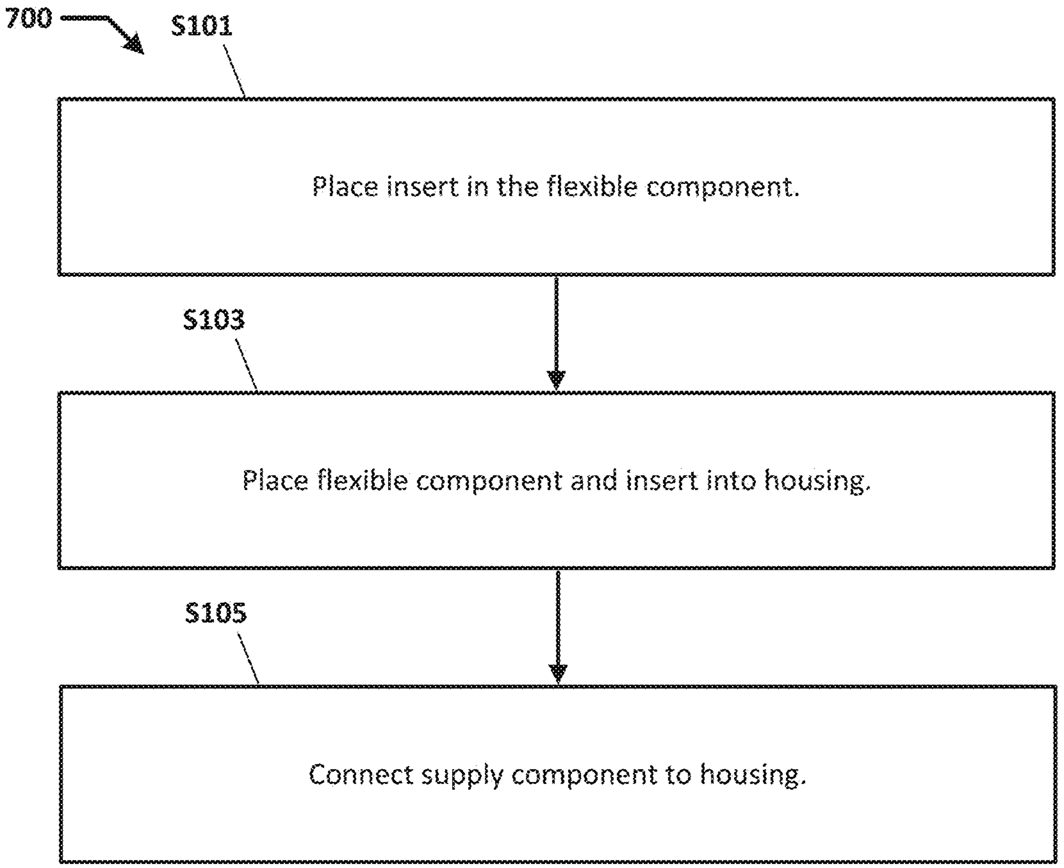
FIG. 12 illustrates a flow chart for assembling a fluidic device in accordance with one example of the present disclosure.

FIG. 12 illustrates a flowchart for assembling a fluidic device in accordance with one example of the present disclosure. The flow chart 700 may be used to assemble any of the fluidic device 400, 500, 600 described herein. For ease of explanation, the flow chart 700 is described below with respect to the fluidic device 400. Additional, different, or fewer acts may be provided.

In a first act S101, the insert is placed in the receptacle or flexible component. Specifically, with respect to fluidic device 400, the insert 430 may be placed within the interior hollow section 424 of the flexible component 420 between the first leg 422 and the second leg 423. When the insert 430 is placed in the flexible component 420, one or more surfaces of the insert including walls 432 protruding therefrom and configured to define an element or feature of a modular fluid oscillator (e.g., 100, 200, 300) may be disposed adjacent to an interior surface of one of the first leg 422 and the second leg 423.

In a second act S103, the receptacle or flexible component and insert are placed in the housing. When the flexible component and insert are placed in the housing, the flexible component, insert, and housing may collectively form a water tight seal with one another defining a pathway through which a flow of fluid received by the housing travels through the fluidic device to the one or more modular fluid oscillators included in the fluidic device, through the modular fluid oscillators, and out of the outlet(s) in the housing. With respect to the fluidic device 400, the flexible component 420 and insert 430 may be placed in the housing 410. The flexible component 420 and insert may be placed in the housing 410 so that the outlet features 433 of one or more modular fluid oscillators align with the outlet 412 of the housing 410.

In a third act S105, the inlet or supply component may be connected to the housing. In some examples, with respect to the fluidic device 400, the supply component 440 may include a tampered portion 441 configured to be inserted into the housing 410, for example, the internal chamber 411 of the housing 410. In other examples, for example, with respect to the fluidic device 500, the supply component 540 may include a hollow interior 541 configured to receive the housing 510. A water tight seal may be formed between the housing and the supply component.

Figure 13:
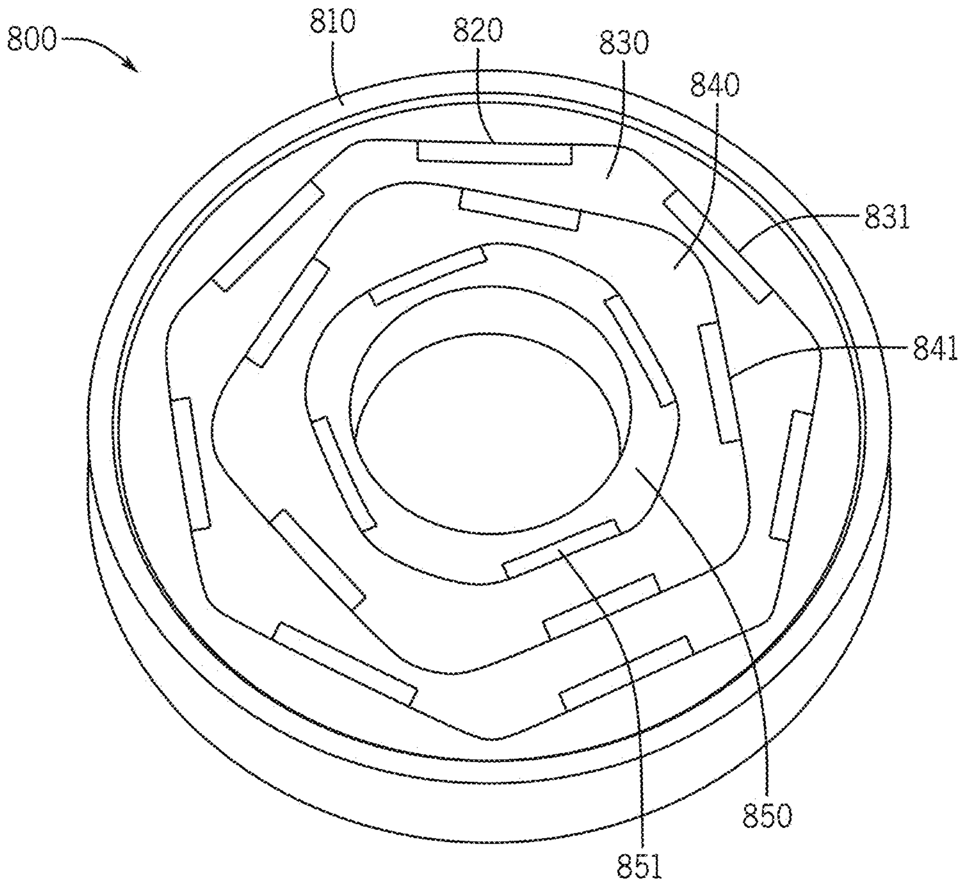
FIG. 13 illustrates a perspective view of a fluidic device in accordance with one example of the present disclosure.
Figure 14:
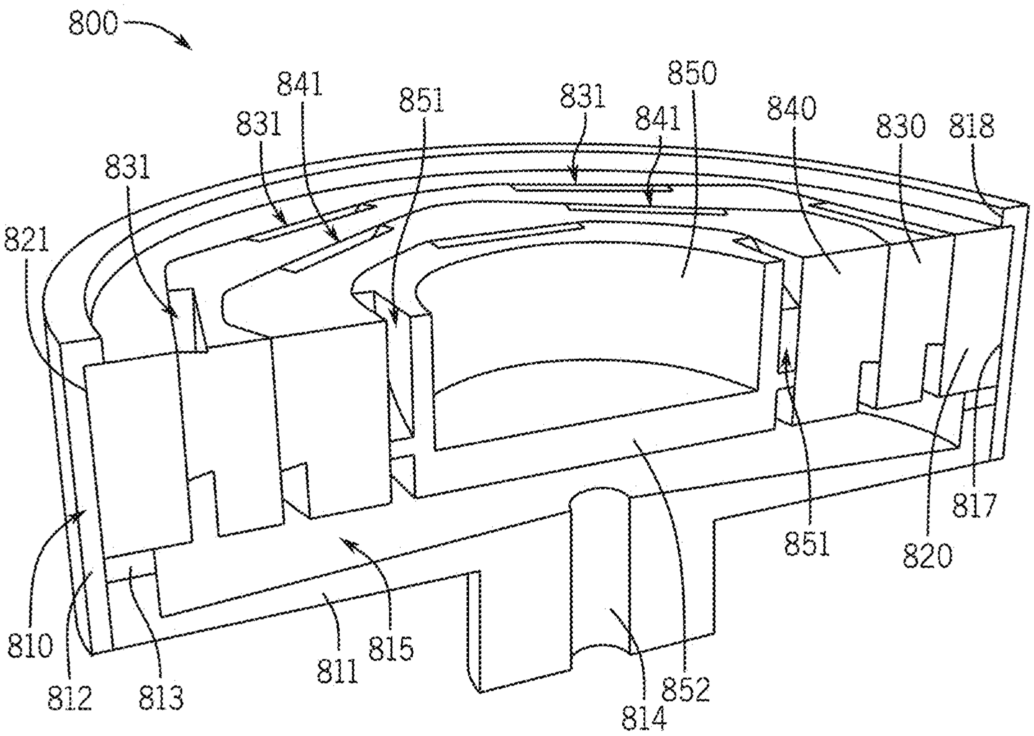
FIG. 14 illustrates a cross-section view of the fluidic device of FIG. 13 in accordance with one example of the present disclosure.
Figure 15:
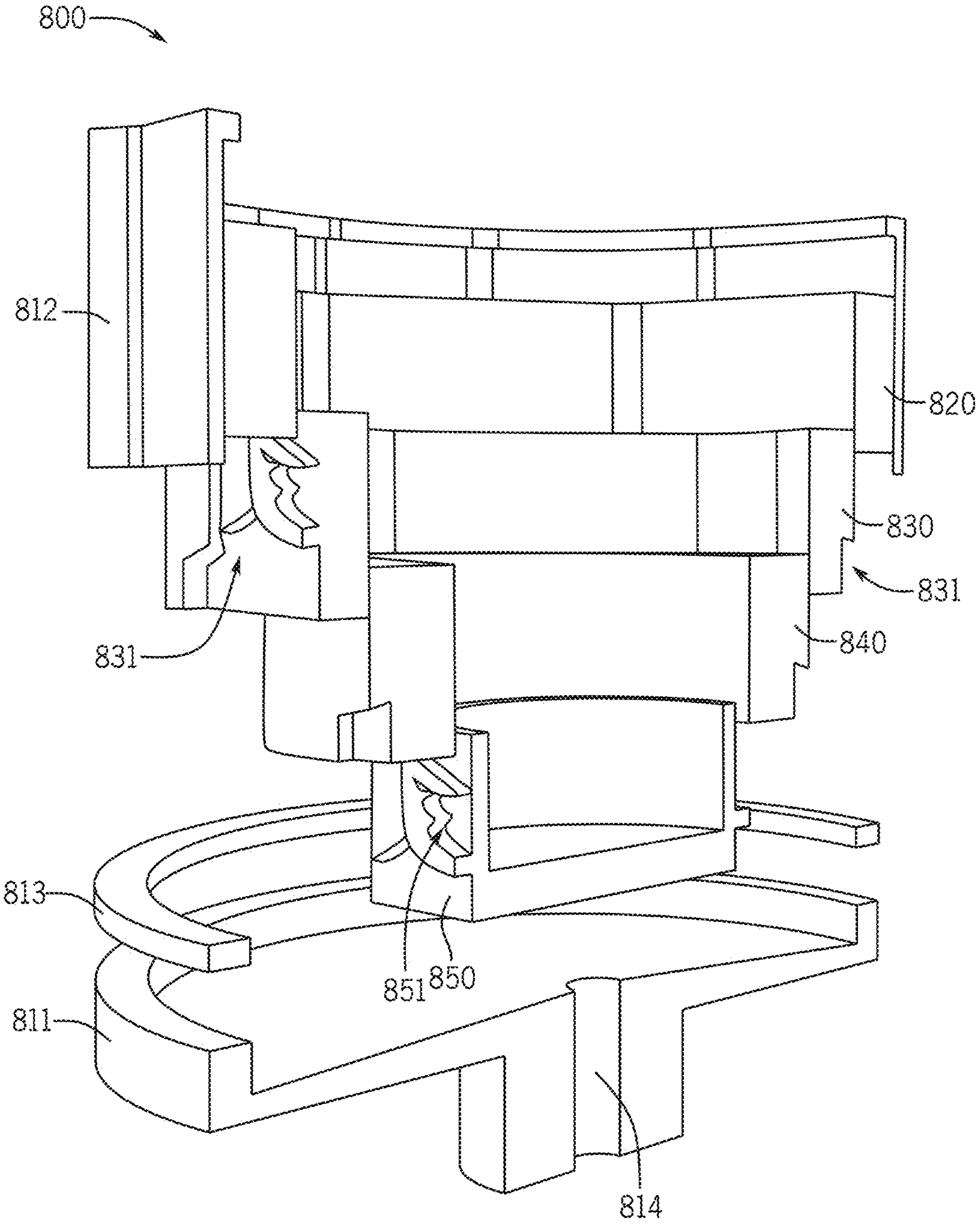
FIG. 15 illustrates an exploded view of the fluidic device of FIG. 13 in accordance with one example of the present disclosure.

Referring generally to FIGS. 13-15, a fluidic device 800 according to an exemplary embodiment of the present disclosure is illustrated. The fluidic device 800 includes a housing 810, an outer circumferential ring 820, and at least one inner circumferential ring 830, 840, 850. In some examples, as illustrated in FIG. 13, the fluidic device 800 may include three inner circumferential rings 830, 840, and 850. The inner circumferential rings may be disposed or nested within the outer circumferential ring and/or one another.

Referring to FIG. 15, illustrating an exploded view of the fluidic device 800, each of the inner circumferential rings 830, 840, 850 may include one or more channels or pathways disposed or formed along an outer surface of the inner circumferential ring. For example, referring generally to FIGS. 13-15, the first inner circumferential ring 830 may include channels 831, the second inner circumferential ring 840 may include channels 841, and the third inner circumferential ring 850 may include channel 851. Each of the pathways or channels 831, 841, 851 disposed along an outer surface of the respective circumferential ring may comprise pathways or channels of a modular fluid oscillator, for example, modular fluid oscillator 100, 200, 300, and one or more pathways (e.g., supply pathways) configured to supply water to the modular fluid oscillator. When an inner circumferential ring is nested in the outer circumferential ring or another inner circumferential ring, the channels (e.g., 831, 841, 851) disposed in the outer surface of the inner circumferential ring and the inner surface of the outer circumferential ring or the inner surface of another inner circumferential ring may collectively form a modular fluid oscillator (e.g., 100, 200, 300). Specifically, the channels 831, 841, 851 disposed along the outer surface of the inner circumferential ring may be disposed adjacent to the inner surface of the outer circumferential ring or the inner surface of another inner circumferential ring. In these examples, the inner surface of the outer circumferential ring or the inner surface of the other or additional inner circumferential ring may collectively form a modular fluid oscillator (e.g., 100, 200, 300). For example, the inner surface of the of the outer circumferential ring or the inner surface of another or additional inner circumferential ring may form a wall or surface of the modular fluid oscillator.

The outer circumferential ring 820 may be disposed within an interior chamber 815 of the housing 810. As illustrated in FIGS. 13-15, an outer perimeter of the outer circumferential ring 820 may have a circular shape. The shape of the outer perimeter of the outer circumferential ring 820 may correspond to the shape of the inner perimeter of the housing 810. Accordingly, when the outer circumferential ring 820 is disposed in the housing 810, an outer surface 821 of the outer retaining member 820 may abut the inner surface 817 of the housing 810. In some examples, the housing 810 may include a retaining lip 818 configured to maintain a position of the outer circumferential ring 820 in the housing 810. The retaining lip 818 may abut the outer circumferential ring 820.

The shape of the outer circumferential ring may vary. In some examples, as illustrated in FIG. 13, the interior perimeter of the outer circumferential ring 820 may have a heptagonal shape. In other examples, the interior perimeter of the outer circumferential ring 820 may have a different shape, for example, a hexagon, pentagon, rectangular, or triangular shape. The shape of the interior perimeter of the outer circumferential ring may correspond to the shape of the outer perimeter of an inner circumferential ring (e.g., first inner circumferential ring 830).

An inner circumferential ring (e.g., inner circumferential ring 830) may be disposed within the outer circumferential ring 820. In some examples, the fluidic device may include two or more inner circumferential rings (e.g., 830, 840, 850). Each of the inner circumferential rings may be disposed or nested in the outer circumferential ring and/or another or different inner circumferential ring. For example, as illustrated in FIGS. 13-15, the third inner circumferential ring 850 may be nested in the second inner circumferential ring 840, the second or additional inner circumferential ring 840 may be nested in the first circumferential ring 830, and the first circumferential ring 830 may be nested in the outer circumferential ring 820. The outer circumferential ring 820 may be nested inside the housing 810.

In some examples, as illustrated in FIGS. 13-15, the fluidic device may include three inner circumferential rings 830, 840, 850; however, the present disclosure is not limited thereto and the fluidic device 800 may include any number of inner circumferential rings. For example, the fluidic device may include a single inner circumferential ring, two inner circumferential rings, or more than three inner circumferential rings.

The shape of each of the inner circumferential rings may vary. In examples including two or more inner circumferential rings, each of the two or more inner circumferential rings may have a different shape. The shape of the outer perimeter or outer surface of each of the inner circumferential rings may correspond to the shape of the inner perimeter or inner surface of another inner circumferential ring in which the inner circumferential ring is disposed or nested. For example, the outer perimeter of an inner circumferential ring may have a heptagon, hexagon, pentagon, rectangle, or triangle shape.

In some examples, as illustrated in FIG. 13, each side of the outer perimeter or outer surface of the inner circumferential ring may include channels or passages disposed along the outer surface of the inner circumferential ring configured to form a modular fluidic oscillator (e.g., 100, 200, 300). For example, as illustrated in FIG. 13, the outer perimeter of the first inner circumferential ring 830 has a heptagonal shape and each of the seven sides of the outer surface of the first inner circumferential rings includes channels or pathways disposed along the outer surface of the inner circumferential ring configured to form a modular fluid oscillator. In some examples, as illustrated in FIG. 13, the outer perimeter of an inner circumferential ring may have less sides than the outer perimeter of another inner circumferential ring in which it was disposed or nested. For example, the outer perimeter of the first inner circumferential ring 830 has seven sides and the outer perimeter of the second inner circumferential ring 840 has five sides.

Referring to FIGS. 14 and 15, in some examples, the housing 810 may comprise a backplate 811, a retaining member 812, and a seal 813. The retaining member 812 may have a hollow cylindrical shape. In some examples, the retaining member 812 may include a retaining lip 818. The outer circumferential ring 820 and the one or more inner circumferential rings (e.g., 830, 840, 85) may be disposed within the retaining member 812. The retaining lip 818 may contact the outer circumferential ring 820 and may be configured to maintain a position of the outer circumferential ring 820 within the retaining member 812. The seal 813 may be disposed within the retaining member 812 between the outer circumferential ring 820 and the backplate 811. A portion of the backplate 811 may be disposed in the retaining member 812. An internal chamber 815 may be formed within the retaining member 812 between the outer circumferential ring 820, inner circumferential rings (e.g., 830, 840, 850), and the backplate 811. The backplate 811 may include an inlet 814 configured to convey a flow of fluid to the internal chamber 815. Each of the modular fluid oscillators included in the fluidic device 800 may be in fluid communication with internal chamber 815 by the channels (e.g., 831, 841, 851) formed along the outer surface of the inner circumferential ring (e.g., 830, 840, 850). In some examples, the innermost inner circumferential ring, for example, as illustrated in FIG. 14, inner circumferential ring 850, may have a circular shape including a wall 852 disposed in the center of the inner circumferential ring 850.

In some examples, the fluidic device 800 illustrated in FIGS. 13-15 may be configured as a shower or faucet head. In other examples, the fluidic device 800 may be included in a rim outlet or sump jet outlet of a toilet. However, the present disclosure is not limited thereto and the fluidic device 800 may be configured as a different plumbing fixture.

Figure 16:
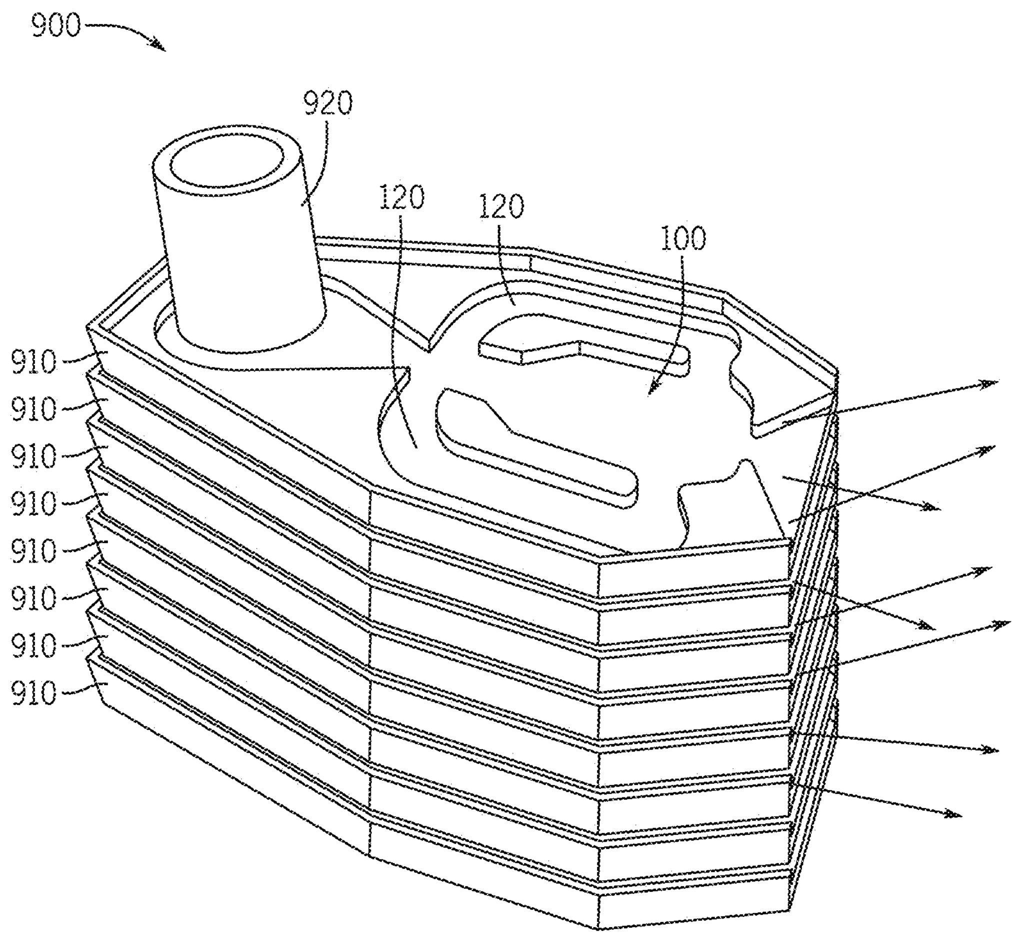
FIG. 16 illustrates a perspective view of a fluidic device in accordance with one example of the present disclosure.

Referring to FIG. 16, a fluidic device 900 in accordance with one example of the present disclosure is illustrated. The fluidic device 900 includes a plurality of stacked oscillator units 910. Each oscillator unit 910 may comprise a different layer of the fluidic device 900. Each oscillator unit 910 may include a modular fluid oscillator (e.g., 100, 200, 300). In some examples, as illustrated in FIG. 16, each oscillator unit 910 may include modular fluid oscillator 100; however, the present disclosure is not limited thereto.

As illustrated in FIG. 16 and described above with respect to FIG. 4, the modular fluid oscillator 100 in each oscillator unit 910 includes two feedback channels 120. In the fluidic device 900, the feedback channels 120 in each oscillator unit 910 may be independent or isolated from the feedback channels in other layers (e.g., oscillator units 910) of the fluidic device 900. The independent or isolated feedback channels between different layers of the fluidic device 900 may result in independently oscillating flows of water the from the modular oscillator 100 disposed in each layer or each oscillator unit 910 of the fluidic device 900. The independently oscillating flows of water from each modular fluid oscillator 100 may oscillate out of phase from one another.

The fluidic device 900 further includes an inlet channel 920. The inlet channel 920 may be in fluid communication with the modular fluid oscillator disposed in each layer or oscillator unit 910. The inlet channel 920 may supply a flow of fluid to each of the oscillator units 910. In some examples, a flow of fluid through the inlet channel 920 may be perpendicular or substantially perpendicular to a flow of fluid through each oscillator unit 910.

In some examples, the fluidic device 900 illustrated in FIG. 16 may be configured as a shower or faucet head. In other examples, the fluidic device 900 may be included in a rim outlet or sump jet of a toilet. However, the present disclosure is not limited thereto and the fluidic device 900 may be configured as a different plumbing fixture.

Figure 17:
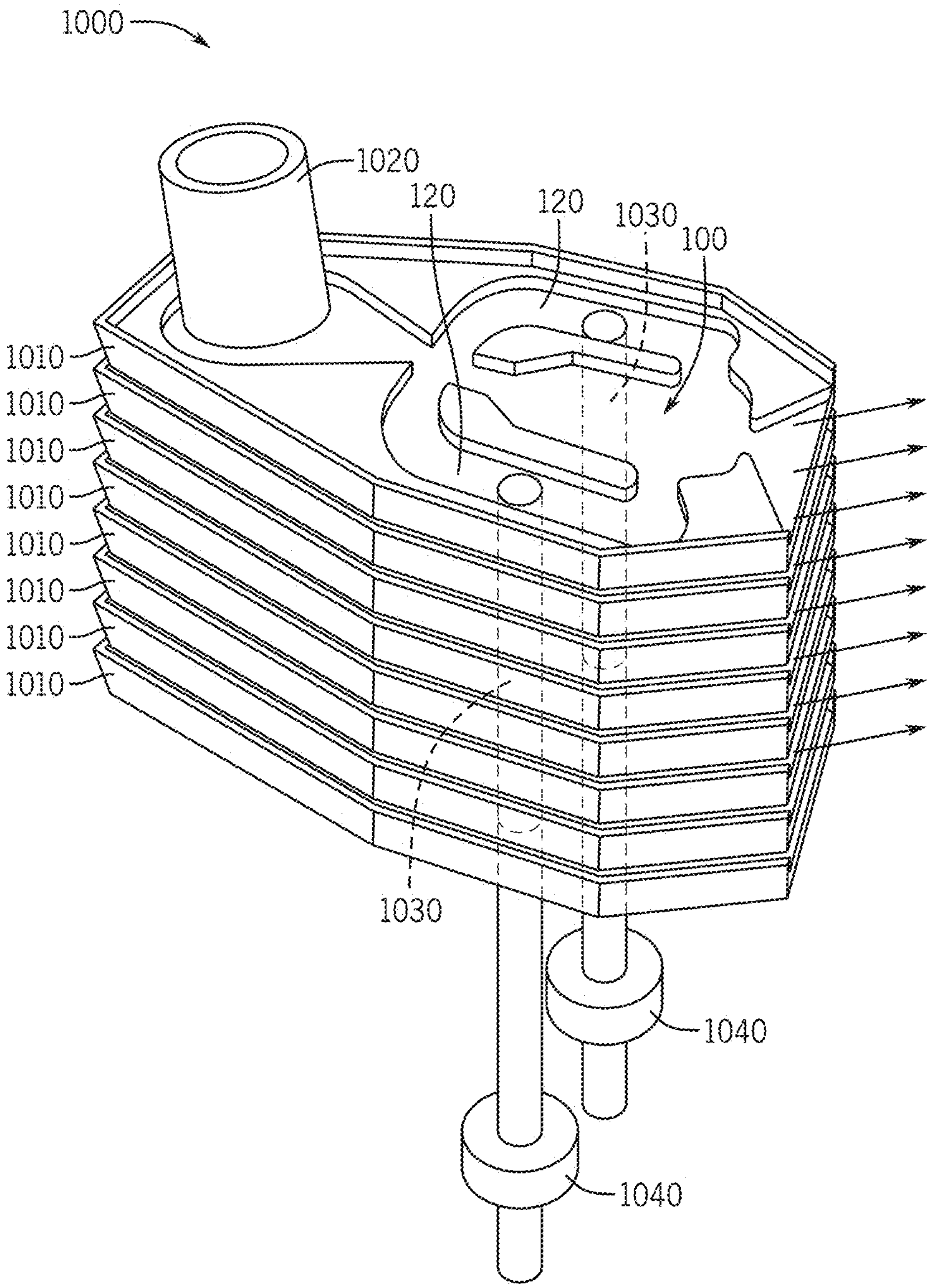
FIG. 17 illustrates a perspective view of a fluidic device in accordance with one example of the present disclosure.

Referring to FIG. 17, a fluidic device 1000 in accordance with another example of the present disclosure is illustrated. The fluidic device 1000 may be similar to the fluidic device 900; however, the fluidic device 1000 includes shared feedback channels 1030. The fluidic device 1000 includes oscillator units 1010 and inlet channel 1020. The oscillator units 1010 may be the same as the oscillator units 910 described above with respect to FIG. 16. The inlet channel 1020 may be the same as the inlet channel 920 described above with respect to FIG. 16.

The fluidic device 1000 includes shared feedback channels 1030. The shared feedback channels 1030 connect the feedback channels in different layers or different oscillator units 1010 of the fluidic device 1000. In some examples, the fluidic device 1000 may include two shared feedback channels 1030. The fluidic device 1030 may include a shared feedback channel 1030 for each feedback channel included in the modular fluid oscillator (e.g., 100, 200, 300). For example, as illustrated in FIG. 17 and described above with respect to FIG. 4, the modular fluid oscillator 100 may include two feedback channels 120 and thus, the fluidic device 1000 may include two shared feedback channels 1030. The shared feedback channels 1030 may cause the modular fluid oscillator 100 in each layer (e.g., oscillator unit 1010) to oscillate in phase with one another.

In some examples, as illustrated in FIG. 17, the shared feedback channels 1030 may extend beyond the oscillator units 1010. In some examples, the length of the shared feedback channels 1030 may be varied in order to change the frequency or period of oscillation of the modular fluid oscillators. In some examples, each feedback channel 1030 may include an adjustment device 1040 configured to change a length of the shared feedback channel 1030. For example, the adjustment device may impinge the feedback channel 1030 shortening the feedback channel and may be slid along the feedback channel to variably change the length of the shared feedback channel 1030.

In some examples, the fluidic device 1000 illustrated in FIG. 17 may be configured as a shower or faucet head. In other examples, the fluidic device 1000 may be included in a rim outlet or sump jet of a toilet. However, the present disclosure is not limited thereto and the fluidic device 1000 may be configured as a different plumbing fixture.

When a component, device, element, or the like of the present disclosure is described as having a purpose or performing an operation, function, or the like, the component, device, or element should be considered herein as being "configured to" meet that purpose or to perform that operation or function.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fluidic device comprising:

a housing configured to receive a flow of water and including an outlet configured to dispense the flow of water;

a flexible component configured to be disposed within the housing, the flexible component including a base, a first leg extending from the base, a second leg extending from the base, and an opening extending through the first leg; and an insert including a surface and one more walls protruding from the surface, the insert configured to be disposed within the housing between the first leg and the second leg, wherein the surface and the one or more walls are disposed adjacent to a surface of the first leg or a surface of the second leg, such that the surface of the insert, the one or more walls, and the surface of the first leg or the surface of the second leg define a flow path of a modular fluid oscillator when the flexible component and insert are disposed in the housing.

2. The fluidic device of claim 1, wherein the insert includes two surfaces having one or more walls protruding therefrom, the one or more walls protruding from each of the two surfaces configured to form features of different modular fluid oscillators.

3. The fluidic device of claim 1, wherein the flexible component is comprised of a first material, the insert is comprised of a second material, different from the first material, and the first material has a lower durometer than the second material.

4. The fluidic device of claim 1, further comprising:

a supply component configured to be disposed in an internal chamber of the housing, the supply component configured to supply the flow of water to the housing.

5. A fluidic device comprising:

a housing configured to receive a flow of water and including an outlet configured to dispense the flow of water;

a flexible component comprised of a first material and configured to be disposed in the housing, the flexible component including a passage configured to convey a flow of water and at least one surface including a cavity formed therein; and an insert comprised of a second material different than the first material, the insert including a surface and one or more walls protruding from the surface, the insert configured to be disposed in the housing, and a portion of the insert configured to be disposed in the cavity, wherein the one or more walls are disposed in the cavity, such that a modular fluid oscillator is formed along an interface between the insert and the flexible component.

6. The fluidic device of claim 5, wherein the one or more walls are configured to form one or more features of the modular fluid oscillator.

7. The fluidic device of claim 5, wherein the first material has a lower durometer than the second material.

8. The fluidic device of claim 5, further comprising:

a supply component configured to be disposed in an internal chamber of the housing, the supply component configured to supply the flow of water to the housing.

9. The fluidic device of claim 5, wherein the modular fluid oscillator comprises a plurality of modular fluid oscillators, and wherein insert includes two surfaces having one or more walls protruding therefrom, the one or more walls extending from each of the two surfaces configured to form one or more features of different modular fluidic oscillators of the plurality of modular fluid oscillators.

10. A fluidic device comprising:

a cylindrical housing configured to receive a flow of water;

an outer circumferential ring disposed in the cylindrical housing; and an inner circumferential ring disposed within the outer circumferential ring, the inner circumferential ring including at least one channel disposed along an outer surface of the inner circumferential ring, the outer circumferential ring and the inner circumferential ring collectively forming at least one modular fluid oscillator.

11. The fluidic device of claim 10, wherein an inner surface of the outer circumferential ring and an outer surface of the inner circumferential ring have the same number of sides.

12. The fluidic device of claim 11, wherein the at least one channel comprises a plurality of channels, and wherein one of the plurality of channels is disposed along each side of the outer surface of the inner circumferential ring.

13. The fluidic device of claim 10, wherein the cylindrical housing comprises a retaining member and a backplate.

14. The fluidic device of claim 10, wherein the at least one modular fluid oscillator is disposed along an interface between an inner surface of the outer circumferential ring and the outer surface of the inner circumferential ring.

15. The fluidic device of claim 10, further comprising:

an additional inner circumferential ring disposed within the first inner circumferential ring, the additional inner circumferential ring including at least one additional ring channel disposed along an outer surface of the additional inner circumferential ring, the inner circumferential ring and the additional inner circumferential ring collectively forming at least one modular fluid oscillator.

16. The fluidic device of claim 15, wherein an outer surface of the inner circumferential ring has more sides than an outer surface of the additional inner circumferential ring.

17. The fluidic device of claim 16, wherein the at least one additional ring channel comprises a plurality of additional ring channels, one of the plurality of additional ring channels being disposed along each side of the outer surface of the additional circumferential ring, the inner circumferential ring and the additional inner circumferential ring collectively forming a modular fluid oscillator along each side of the outer surface of the additional inner circumferential ring.

* * * * *